(12) United States Patent
Chakraborti et al.

(10) Patent No.: US 10,171,523 B2
(45) Date of Patent: Jan. 1, 2019

(54) MULTI-TIER PUSH SERVICE CONTROL ARCHITECTURE FOR LARGE SCALE CONFERENCE OVER ICN

(71) Applicant: Futurewei Technologies, Inc., Plano, TX (US)

(72) Inventors: Asit Chakraborti, Pleasanton, CA (US); Guoqiang Wang, Santa Clara, CA (US); Jun Wei, San Jose, CA (US); Ravishankar Ravindran, San Ramon, CA (US); Xuan Liu, Mission, KS (US)

(73) Assignee: Futurewei Technologies, Inc., Plano, TX (US)

( * ) Notice: Subject to any disclaimer, the term of this patent is extended or adjusted under 35 U.S.C. 154(b) by 319 days.

(21) Appl. No.: 14/280,325

(22) Filed: May 16, 2014

(65) Prior Publication Data

US 2014/0344378 A1 Nov. 20, 2014

Related U.S. Application Data

(60) Provisional application No. 61/824,656, filed on May 17, 2013, provisional application No. 61/984,505, filed on Apr. 25, 2014.

(51) Int. Cl.
*H04L 29/06* (2006.01)
*H04L 12/18* (2006.01)

(52) U.S. Cl.
CPC ........ *H04L 65/403* (2013.01); *H04L 12/1831* (2013.01)

(58) Field of Classification Search
CPC ................ H04L 65/403; H04L 12/1831
See application file for complete search history.

(56) References Cited

U.S. PATENT DOCUMENTS 6,477,545 B1 * 11/2002 LaRue .............. G06F 17/30575
707/625
2004/0205175 A1 * 10/2004 Kammerer ............ H04L 12/581
709/223

(Continued)

FOREIGN PATENT DOCUMENTS

JP         2008276551 A    11/2008
JP         2013251812    *  6/2012   ............... H04N 7/15

(Continued)

OTHER PUBLICATIONS

Ravindran, R., et al., "Towards Software Defined ICN based Edge-Cloud Services," IEEE 2nd International Conference on Cloud Networking (CloudNet): Industry-Track Paper, Nov. 11, 2013, pp. 227-235.

(Continued)

*Primary Examiner* — Shean Tokuta
*Assistant Examiner* — Juan C Turriate Gastulo
(74) *Attorney, Agent, or Firm* — Conley Rose, P.C.

(57) ABSTRACT

A network element (NE) comprising a memory configured to store a digest log for a conference, a receiver coupled to the memory and configured to receive a first message from a first of a plurality of service proxies of the conference, wherein the first message comprises a signature profile of a first of a plurality of participants of the conference associated with the first service proxy, a processor coupled to the receiver and the memory and configured to track a state of the conference by updating the digest log according to the first message, and a transmitter coupled to the processor and configured to send a plurality of second messages to indicate the digest log update to the service proxies without a transmission request from the service proxies.

19 Claims, 13 Drawing Sheets

(56) References Cited

U.S. PATENT DOCUMENTS

| | | | |
|---|---|---|---|
| 2006/0282408 A1 | 12/2006 | Wisely et al. | |
| 2008/0003964 A1 | 1/2008 | Alperin et al. | |
| 2008/0155104 A1* | 6/2008 | Quinn | H04L 67/02 709/227 |
| 2009/0215463 A1* | 8/2009 | Satake | H04M 3/56 455/445 |
| 2010/0061538 A1 | 3/2010 | Coleman et al. | |
| 2010/0234018 A1* | 9/2010 | Lawler | H04L 12/5895 455/426.1 |
| 2011/0110364 A1 | 5/2011 | Fried et al. | |
| 2012/0142324 A1 | 6/2012 | Kim et al. | |
| 2012/0221715 A1* | 8/2012 | Hamada | H04L 67/22 709/224 |
| 2012/0278455 A1* | 11/2012 | Peng | H04L 67/1095 709/220 |
| 2013/0117373 A1* | 5/2013 | Umehara | H04M 3/42374 709/204 |
| 2013/0166695 A1* | 6/2013 | Lee | H04L 67/1065 709/219 |
| 2013/0321556 A1* | 12/2013 | Uchiyama | H04N 7/15 348/14.02 |
| 2014/0150059 A1* | 5/2014 | Uchida | G06F 17/30943 726/3 |

FOREIGN PATENT DOCUMENTS

| | | |
|---|---|---|
| JP | 2012195925 A | 10/2012 |
| WO | 2011027475 A1 | 3/2011 |

OTHER PUBLICATIONS

Foreign Communication From a Counterpart Application, PCT Application No. PCT/US2014/038483, International Search Report dated Nov. 28, 2014, 5 pages.

Foreign Communication From a Counterpart Application, PCT Application No. PCT/US2014/038483, Written Opinion dated Nov. 28, 2014, 10 pages.

Zhu, Z, et al., "Chronos: Serverless Multi-User Chat Over NDN," NDN, Technical Report NDN-0008, 2012, http://named-data.net/techreports.html, Revision 1: Oct. 10, 2012, 12 pages.

Machine Translation and Abstract of Japanese Patent Application No. JP2008276551, Nov. 13, 2008, 47 pages.

Foreign Communication From a Counterpart Application, Japanese Application No. 2016-514145, Japanese Office Action dated Jan. 10, 2017, 3 pages.

Foreign Communication From a Counterpart Application, Japanese Application No. 2016-514145, English Translation of Japanese Office Action dated Jan. 10, 2017, 4 pages.

Office Action dated Mar. 13, 2017, 30 pages, U.S. Appl. No. 14/280,336, filed Mar. 13, 2017.

Office Action dated Nov. 30, 2017, 21 pages, U.S. Appl. No. 14/280,336, filed May 16, 2014.

Office Action dated Sep. 19, 2016, 7 pages, U.S. Appl. No. 14/280,336, filed May 16, 2014.

Office Action dated Aug. 1, 2018, 17 pages, U.S. Appl. No. 14/280,336, filed May 16, 2014.

* cited by examiner

MULTI-TIER PUSH SERVICE CONTROL ARCHITECTURE FOR LARGE SCALE CONFERENCE OVER ICN

CROSS-REFERENCE TO RELATED APPLICATIONS

The present application claims priority to U.S. Provisional Patent Application 61/824,656, filed May 17, 2013 by Guoqiang Wang, et. al., and entitled "Multitier "Push" Service Control for Virtual Whiteboard Conference Over Large Scale ICN Architecture", and U.S. Provisional Patent Application 61/984,505, filed Apr. 25, 2014 by Asit Chakraborti, et. al., and entitled "Multitier "Push" Service Control for Virtual Whiteboard Conference Over Large Scale ICN Architecture", both which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual conferencing may refer to a service that allows conference events and/or data to be shared and/or exchanged simultaneously with multiple participants located in geographically distributed networking sites. The service may allow participants to interact in real-time and may support point-to-point (P2P) communication (e.g. one sender to one receiver), point-to-multipoint (P2MP) communication (e.g. one sender to multiple receivers), and/or multipoint-to-multipoint (MP2MP) communication (e.g. multiple senders to multiple receivers). Some examples of virtual conferencing may include chat rooms, E-conferences, and virtual white board (VWB) services, where participants may exchange audio, video, and/or data over the Internet. Some technical challenges in virtual conferencing may include real-time performance (e.g. real-time data exchanges among multi-parties), scalability (e.g. with one thousand to ten thousand (10K) participants), and interactive communication (e.g. MP2MP among participants, participants with simultaneous dual role as subscriber and publisher) support.

SUMMARY

In one embodiment, the disclosure includes a network element (NE) comprising a memory configured to store a digest log for a conference, a receiver coupled to the memory and configured to receive a first message from a first of a plurality of service proxies of the conference, wherein the first message comprises a signature profile of a first of a plurality of participants of the conference associated with the first service proxy, a processor coupled to the receiver and the memory and configured to track a state of the conference by updating the digest log according to the first message, and a transmitter coupled to the processor and configured to send a plurality of second messages to indicate the digest log update to the service proxies without a transmission request from the service proxies.

In one embodiment, the disclosure includes a method for synchronizing service controls for a conference at a service proxy in an Information Centric Networking (ICN) network, the method comprising receiving a first message from a first of a plurality of conference participants associated with the service proxy, wherein the first message comprises a signature profile of the first conference participant, wherein the first message is received by employing an ICN content name based routing scheme, performing a first update for a digest log according to the first message, and pushing a second message to indicate the first update to a centralized service controller of the conference.

In yet another embodiment, the disclosure includes a computer program product for use by a first service client participating in a conference in an ICN network, wherein the computer program product comprises computer executable instructions stored on a non-transitory computer readable medium such that when executed by a processor cause the first service client to receive a signature profile from a conference application, push a first control message comprising the signature profile to a first service proxy of the conference, wherein the first service client is associated with the first service proxy, receive a second control message from the first service proxy comprising a current root state of the first service proxy and a last root state of the first service proxy, upon receiving the second control message, record the current root state in a current entry of a digest log, and obtain a conference data plane message from a second service client based on data received in the second signature profile.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
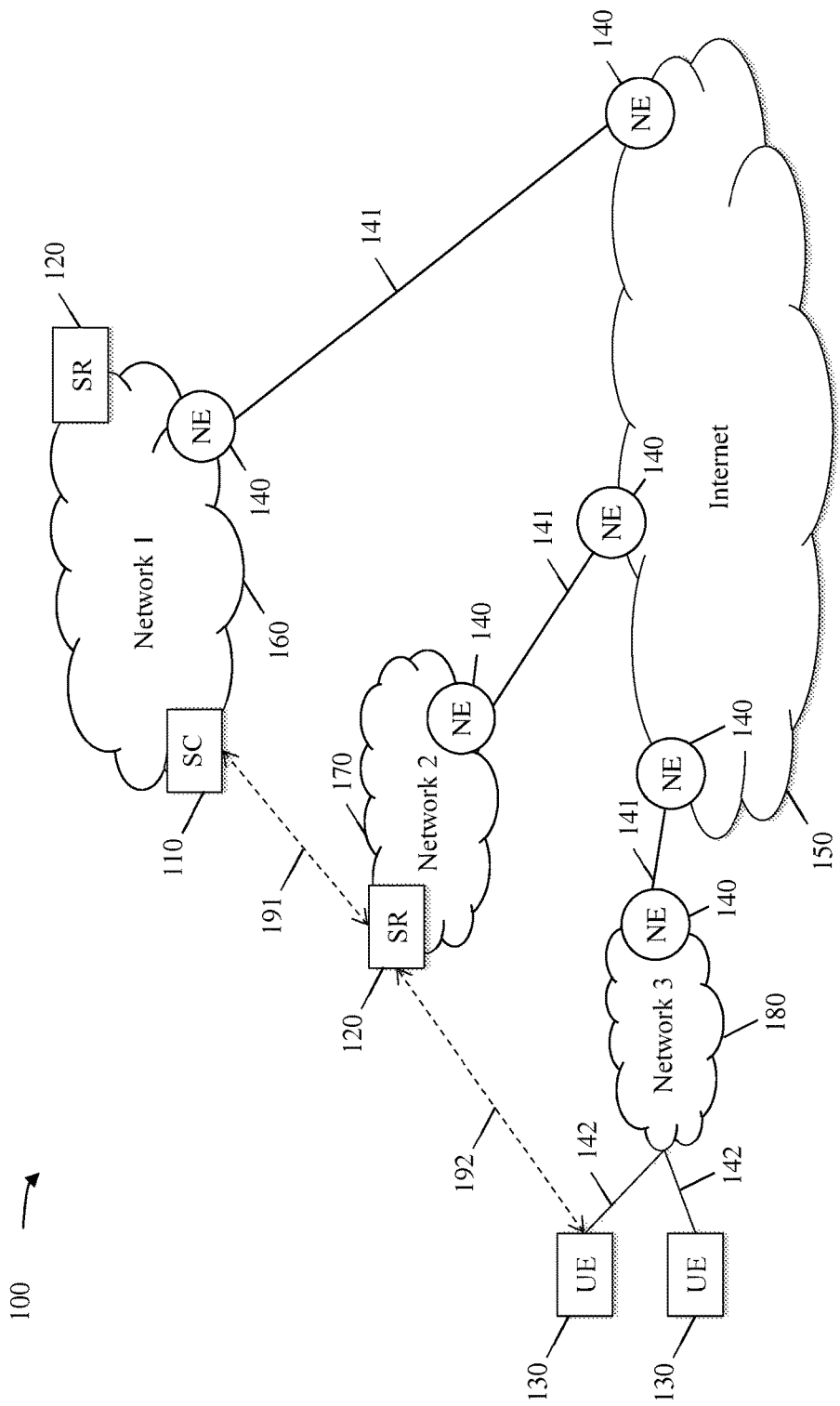
FIG. 1 is a schematic diagram of an embodiment of a multi-tier conference service network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Conference applications and/or systems may support real-time information and/or media data exchange among multiple parties located in a distributed networking environment. Some conference applications and/or systems may be implemented over a host-to-host Internet Protocol (IP) communication model and may duplicate meeting traffics over Wide Area Network (WAN) links. For example, in a server-centric model, a central server may control and manage a conference, process data from participants (e.g. meeting subscribers), and then redistribute the data back to the participants. The server-centric model may be simple for control management, but the duplication and/or redistribution of conference data may lead to high data traffic concentration at the server. For example, the data traffic in a server-centric model may be in an order of $N^2$ ($O(N^2)$), where N may represent the number of participants. Thus, the server-centric model may not be suitable for large scale conferences (e.g. with 1000 to 10K participants).

Some conference service technologies may employ a Content Delivery Networking (CDN) model and/or a P2P content distribution networking model (e.g. multi-server architecture) to reduce the high data traffic in a server-centric model. However, CDN models and/or P2P content distribution networking models may be over-the-top (OTT) solutions, where content (e.g. audio, video, and/or data) may be delivered over the Internet from a source to end users without network operators being involved in the control and/or distribution of the content (e.g. content providers operate independently from network operators). As such, networking optimizations and/or cross-layer optimizations may not be easily performed in CDN models and/or P2P content distribution networking models, and thus may lead to inefficient bandwidth utilization. In addition, CDN models and/or P2P content distribution networking models may not support MP2MP communication and may not be suitable for real-time interactive communication.

Some other conference service technologies, such as Chronos, may employ a Name Data Networking (NDN) model to improve bandwidth utilization and reduce traffic load by leveraging NDN features, such as sharable and distributed in-net storage and name-based routing mechanisms. NDN may be a receiver driven, data centric communication protocol, in which data flows through a network when requested by a consumer. The data access model in NDN may be referred to as a pull-based model. However, conference events and/or updates may be nondeterministic as conference participants may publish meeting updates at any time during a conference. In order to access nondeterministic conference events in a pull-based model, participants may actively query conference events. For example, every participant in Chronos may periodically broadcast a query to request meeting updates from other participants. Thus, control signaling overheads in Chronos may be significant. In addition, the coupling of the data plane and the control plane in Chronos may lead to complex support for simultaneous data updates and/or recovery. Thus, Chronos may not be suitable for supporting real-time interactive large scale conferences.

ICN architecture is a type of network architecture that focuses on information delivery. ICN architecture may also be known as content-aware, content-centric, or data oriented networking architecture. ICN models may shift the IP communication model from a host-to-host model to an information-object-to-object model. The IP host-to-host model may address and identify data by storage location (e.g. host IP address), whereas the information-object-to-object model may employ a non-location based addressing scheme that is content-based. Information objects may be the first class abstraction for entities in an ICN communication model. Some examples of information objects may include content, data streams, services, user entities, and/or devices. In an ICN architecture, information objects may be assigned with non-location based names, which may be used to address the information objects, decoupling the information objects from locations. Routing to and from the information objects may be based on the assigned names. ICN architecture may provision for in-network caching, where any network device or element may serve as a temporary content server, which may improve performance of content transfer. The decoupling of information objects from location and the name-based routing in ICN may allow mobility to be handled efficiently. ICN architecture may also provision for security by appending security credentials to data content instead of securing the communication channel that transports the data content. As such, conference applications may leverage ICN features, such as name-based routing, security, multicasting, and/or multi-path routing, to support real-time interactive large scale conferences.

Disclosed herein is a conference service control architecture which may employ a multi-tier event pushing mechanism for synchronizing conference updates. The conference service control architecture may comprise a centralized service controller at a first tier, distributed service proxies at a second tier, and participants at a third tier. The centralized service controller and the service proxies may synchronize and distribute conference updates to all participants via a push mechanism. Conference updates may include participants' fingerprints (FPs), which may include signatures and/or credentials of the participants, and/or update sequence numbers associated with the FPs. The centralized service controller, each service proxy, and each participant may maintain a digest log to track conference updates. Each digest log may comprise a snapshot of a current localized view (e.g. in the form of a digest tree) and a history of participants' FPs. For example, the centralized service controller may comprise a controller digest tree with a complete view of the service proxies and the participants including the participant's FPs and a history of FP updates corresponding to the digest tree. Each service proxy may comprise a proxy digest tree with a local view of the participants attached to the service proxy and the root of the controller digest tree (e.g. controller digest root), and a history of FP updates corresponding to the proxy digest tree. Each participant may comprise a digest tree with the root of the proxy digest tree (e.g. root digest) and a history of FP updates corresponding to the root digest. Thus, synchronization may operate according to a child-parent relationship (e.g. proxy-controller, participant-proxy). The push mechanism, the digest log structure, and the child-parent relationship for synchronization may enable efficient conference updates and/or notifications, as well as fast recovery from network interruptions. The disclosed conference service control architecture may leverage native ICN in-network storage and name-based routing. The disclosed conference service control architecture may provide control plane and data plane separately. The disclosed conference service control architecture may also limit multicasting at the service edge. For example, control traffic may be reduced to a linear order of service proxies, and thus may be suitable for supporting real-time interactive large scale conferences.

FIG. 1 is a schematic diagram of an embodiment of a centralized multi-tier conference service network 100. Network 100 may comprise a conference service controller (SC) node 110, a plurality of conference service routers (SRs) 120, and a plurality of user equipment (UEs) 130. The SC node 110 may be situated in a network 160, which may be a third party network, a provider network, and/or any other network. The plurality of SRs 120 may be situated in network 160 and/or another network 170. For example, network 170 may be an edge cloud network 170 that employs edge computing to provide widely dispersed distributed services and/or any other network. The plurality of UEs 130 may be connected to a network 180 via links 142 (e.g. wireless and/or wireline links). In an embodiment, network 180 may be any Layer two (L2) access network (e.g. wireless access network, wireline access network, etc.), where L2 may be a data link layer in an Open System Interconnection (OSI) model. The networks 160, 170, and 180 may be interconnected via an Internet network 150 via links 141. The Internet network 150 may be formed from one or more interconnected local area networks (LANs), metropolitan area networks (MANs), wide area networks (WANs), etc. In an embodiment, the Internet network 150 may comprise an Internet Service Provider (ISP) network. The links 141 may include physical connections, such as fiber optic links, electrical links, and/or logical connections. Each of the networks 150, 160, 170, and/or 180 may comprise a plurality of NEs 140, which may be routers, gateways, switches, edge routers, edge gateways, and/or any network devices suitable for routing and communicating packets as would be appreciated by one of ordinary skill in the art. It should be noted that networks 150, 160, 170, and/or 180 may be alternatively configured and the SC 110, the SRs 120, and the UEs 130 may be alternatively situated in the network 100 as determined by a person of ordinary skill in the art to achieve the same functionalities.

The SC node 110 may be a server, a virtual machine (VM), and/or any network device that may be configured to manage controls and/or signaling for one or more large scale conferences (e.g. chat rooms, E-conference services, VWB services, etc. with about 1000 to about 10K participants). For example, SC node 110 may be a centralized conference controller that communicates with a plurality of SRs 120 to synchronize conference controls and/or signaling. The centralized conference controller may be referred to as a service controller. In an embodiment, the SC node 110 may host one or more VMs, where each VM may act as a service controller for a different conference. In some embodiments, SC 110 may operate in a cloud-based computing environment and may comprise a cloud orchestrator, a computing resource manager, a storage manager, and/or a network manager. The cloud orchestrator may manage the interconnections and interactions among cloud-based enterprise operating units by controlling and distributing computing and storage resources via the computing resource manager and the storage manager, respectively. In addition, the cloud orchestrator may manage and control networking functions via the network manager. For example, the cloud orchestrator may determine to spawn additional VMs or re-distribute computing and storage resources dynamically in response to changes in network conditions (e.g. traffics, channel conditions, etc.) and/or applications (e.g. additions, removals, and/or changes in requirement).

Each SR 120 may be a router, a VM, and/or any network device that may be configured to synchronize controls and/or signaling for a large scale conference between a centralized conference controller and a plurality of conference participants, where the conference controller may be situated in a SC node 110 and the conference participants may be participating the conference from UEs 130. For example, SR 120 may act as a conference proxy and may be referred to as a service proxy. In an embodiment, the SR 120 may host one or more VMs, where each VM may act as a service proxy for a different conference. It should be noted that each SR 120 may serve a different group of conference participants.

Each UE 130 may be an end user device, such as a mobile device, a desktop, a cellphone, and/or any network device configured to participate in one or more large scale conferences. For example, a conference participant may participate in a conference by executing a conference application on a UE 130. The conference participant may request to participate in a particular conference by providing a FP and a conference name. The conference participant may also subscribe and/or publish data for the conference. In network 100, each UE 130 may be referred to as a service client and may synchronize conference controls and/or signaling with a service proxy.

In an embodiment, network 100 may be an ICN-enabled network, which may employ ICN name-based routing, security, multicasting, and/or multi-path routing to support large scale conference applications. Network 100 may comprise a control plane separate from a data plane. For example, network 100 may employ a three-tier architecture for conference controls and signaling in the control plane. The three-tier architecture may refer to a controller-proxy-client relationship. The three-tier architecture may comprise a controller layer, a proxy layer, and a client layer. The controller layer may include a centralized service controller situated in SC node 110, the proxy layer may include a plurality of service proxies situated in SRs 120, and the client layer may include a plurality of service clients situated in UEs 130.

In an embodiment, control paths 191 and 192 may be logical paths for exchanging conference controls and signaling. A service controller situated in SC node 110 may exchange controls and signaling of a conference with one or more service proxies situated in SRs 120 via control path 191. A service proxy may exchange conference controls and signaling with one or more service clients situated in UEs 130 via control path 192. Path 191 may comprise an upstream transmission from service proxy to service controller and a downstream transmission from a service controller to a service proxy. Similarly, path 192 may comprise an upstream transmission from a service client to a service proxy and a downstream transmission from a service proxy to a service client. For example, a service controller may be a centralized manager that manages and controls a conference and a service proxy may mediate between the service controller and service clients of the conference. It should be noted that the service controller and the service proxies may participate in control plane functions, but may not participate in data plane functions. As such, data communications (e.g. audio, video, rich text exchanges) among the service clients may be independent from the conference controls.

In an embodiment, a push mechanism may be employed for synchronizing conference controls (e.g. FPs, other signed information, events, etc.) between a service controller, service proxies, and service clients. A push mechanism may refer to a sender initiating transmissions of information without a request from an interested recipient as opposed to an ICN protocol pull mechanism where an interested recipient may pull information from an information source. A push mechanism may be more suitable for conference control synchronization than a pull model due to the unpredictable (e.g. not pre-deterministic) nature of conference events (e.g. any participant may publish information at any time). In a push networking model, when a service proxy receives a FP update from a service client, the service proxy may generate a first local update according to the received FP update and push the first local update to the service controller. The service controller may generate a global update by consolidating the received local update with other service proxies' local updates and may push the global update to all of the service proxies. When a service proxy receives the global update, the service proxy may generate a second local update according to the received global update and may push the second local update to the connected service clients. The push mechanism may enable real-time or nearly real-time communications, which may be an important performance factor for conference services. It should be noted that after a service client receives updated FPs, the service client may fetch data over native ICN in-network storage with name-based routing.

Figure 2:
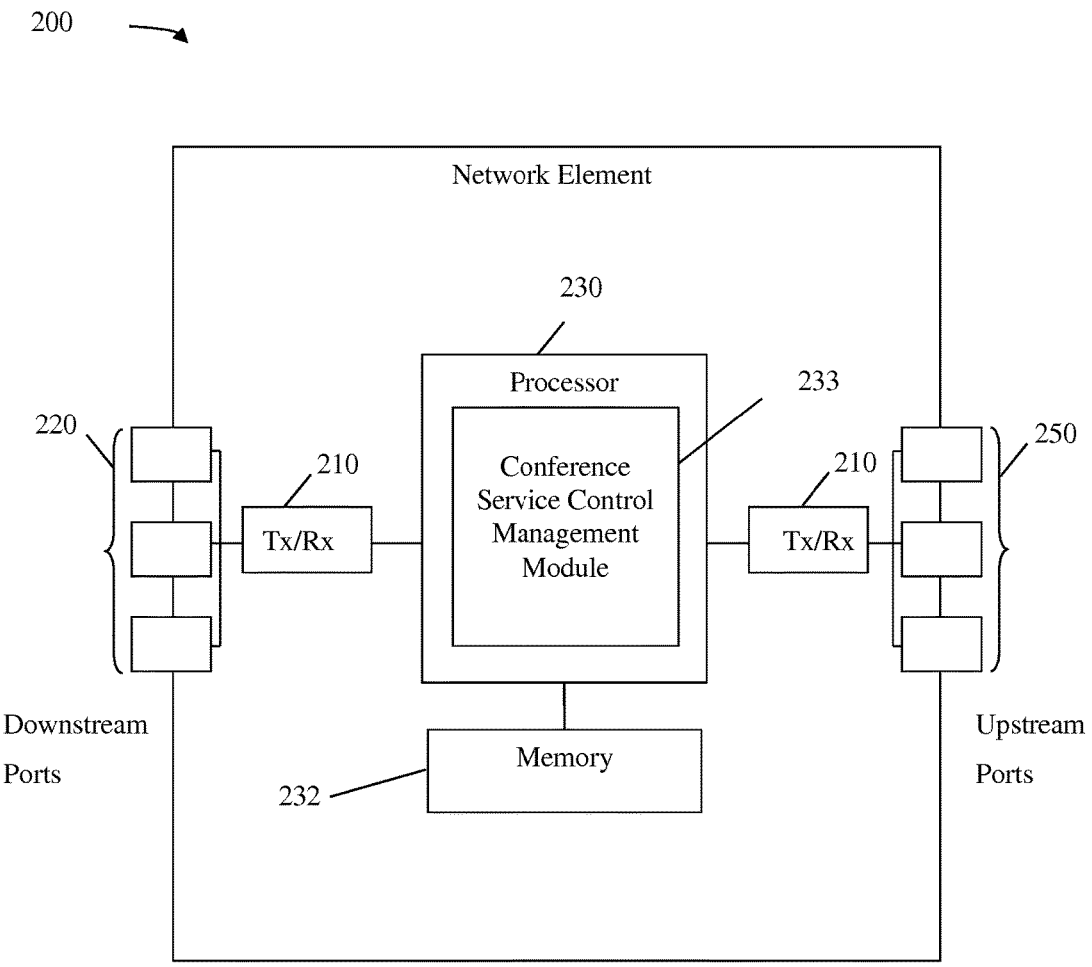
FIG. 2 is a schematic diagram of an embodiment of a network element (NE), which may act as a node in a multi-tier conference service network.

FIG. 2 is a schematic diagram of an embodiment of an NE 200, which may act as a service controller (e.g. situated in a SC node 110), a service proxy (e.g. situated in a SR 120), and/or a service client (e.g. situated in a UE 130) by implementing any of the schemes described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/ methods described in the disclosure may be implemented in a network apparatus or component such as an NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a conference service control management module 233, which may implement a conference bootstrap method 1200, a conference synchronization method 1300, a conference recovery method 1400, and/or any other MP2MP related communication functions discussed herein. In an alternative embodiment, the conference service control management module 233 may be implemented as instructions stored in the memory devices 232 (e.g. a computer program product), which may be executed by processor 230. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
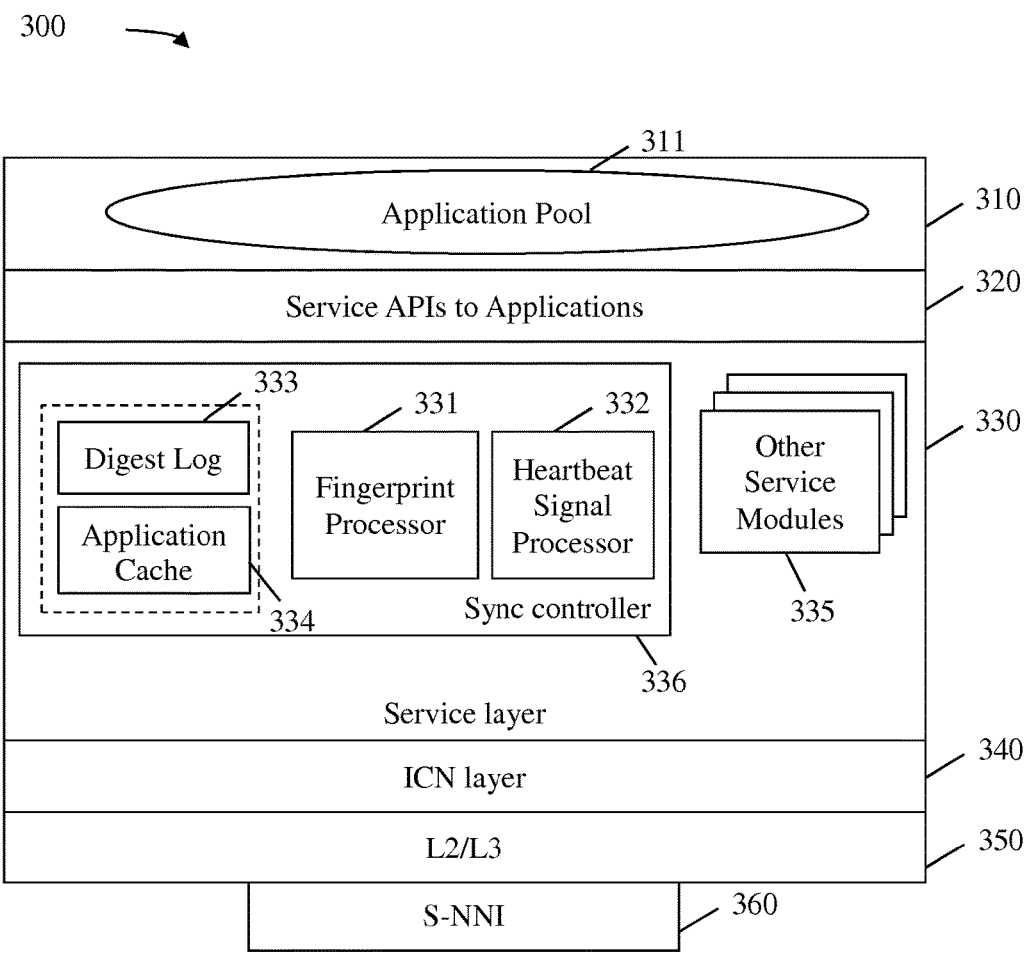
FIG. 3 is a schematic diagram of an embodiment of an architectural view of an Information Centric Networking (ICN)-enabled service controller.

FIG. 3 is a schematic diagram of an embodiment of an architectural view of an ICN-enabled service controller 300, which may be situated in a SC node (e.g. SC node 110) in a multi-tier conference service network (e.g. network 100). The service controller 300 may comprise an application layer 310, a service application programming interface (API) to application layer 320, a service layer 330, an ICN layer 340, a L2/Layer three (L3) layer 350, and a service network-to-network interface (S-NNI) layer 360.

The application layer 310 may comprise an application pool 311, which may comprise a plurality of applications, such as chat, VWB, and/or other applications. The service API to application layer 320 may comprise a set of APIs for interfacing between the application layer 310 and the service layer 330. The APIs may be well-defined function calls and/or primitives comprising input parameters, output parameters, and/or return parameters.

The service layer 330 may comprise a synchronization (sync) controller 336 and other service modules 335. For example, the sync controller 336 may be a centralized manager that manages the service controls for a conference (e.g. chat, VWB, etc.) and the other service modules 335 may manage and/or control other services. The ICN layer 340 may comprise ICN protocol layer modules, which may include a content store (CS) (e.g. caching interest and/or data), a forwarding information base (FIB) (e.g. name-based routing look up), and/or a pending interest table (PIT) (e.g. records of forwarded interests). The L2/L3 layer 350 may comprise networking protocol stack modules, which may include data and/or address encoding and/or decoding for network transmissions. The L2 layer and the L3 layer may be referred to as the data link layer and the network layer in the OSI model. The S-NNI layer 360 may interface (e.g. signaling functions between networks) with one or more SRs (e.g. SRs 120) and/or other SC nodes 110 situated in the network.

The sync controller 336 may centrally manage control flows for a conference. The sync controller 336 may communicate with one or more service proxies (e.g. situated in SRs 120) serving the conference to synchronize FPs of conference participants (e.g. situated in UEs 130). The sync controller 336 may comprise a FP processor 331, a heartbeat signal processor 332, a digest log 333, and an application cache 334.

The FP processor 331 may receive upstream FP updates (e.g. FPs of participants) from the service proxies. The FP processor 331 may consolidate the received upstream FP updates into a global FP update and may send the global FP update downstream to each service proxy (e.g. unicast transmission) by employing a push mechanism. The FP processor 331 may receive the upstream FP updates and/or send the downstream global FP updates in the form of notification messages via the ICN layer 340, the L2/L3 layer 350, and/or the S-NNI layer 360. It should be noted that the notification messages may include ICN interest packets and/or ICN data packets, which may be handled according to ICN protocol (e.g. forwarded according to a FIB and/or cached in a CS).

The heartbeat signal processor 332 may monitor liveliness (e.g. functional and connectivity statuses) of the service proxies and may indicate liveliness of the sync controller 336 to the connected service proxies. For example, the heartbeat signal processor 332 may generate and send heartbeat indication signals (e.g. periodically and/or event-driven) to the service proxies. The heartbeat signal processor 332 may also listen to heartbeat indication signals from the service proxies. In some embodiments, the heartbeat signal processor 332 may send a heartbeat response signal to confirm the reception of a heartbeat indication signal. When the heartbeat signal processor 332 detects missing heartbeat indication signals and/or heartbeat response signals from a service proxy over a duration that exceeds a predetermined timeout interval, the heartbeat signal processor 332 may send a network failure signal to the application layer 310 to notify the application served by the faulty service proxy of the network failure. The heartbeat signals may be sent and/or received in the form of heartbeat messages via the ICN layer 340, the L2/L3 layer 350, and the S-NNI layer 360. It should be noted that the heartbeat messages may include ICN interest packets and/or ICN data packets, which may be handled according to ICN protocol (e.g. forwarded according to a FIB and cached in a CS).

The digest log 333 may be a cache or any temporary data storage that records recent FP updates. The digest log 333 may store a complete view of the service proxies and service clients of the conference, where the complete view may be represented in the form of a digest tree as discussed more fully below. The digest log 333 may also store a history of FP updates corresponding to the digest tree, where each entry may be in the form of <controller digest root>:<proxy local digest root>:<user FP> as discussed more fully herein below. The application cache 334 may be a temporary data storage that stores FPs that are in transmission (e.g. transmission status may not be confirmed). The FP processor 331 may manage the digest log 333 and/or the application cache 334 for storing and tracking FP updates. In an embodiment, the FP processor 331 and the heartbeat signal processor 332 may serve one or more conferences (e.g. a chat and a VWB). In such an embodiment, the FP processor 331 may employ different digest logs 333 and/or different application caches 334 for different conferences.

Figure 4:
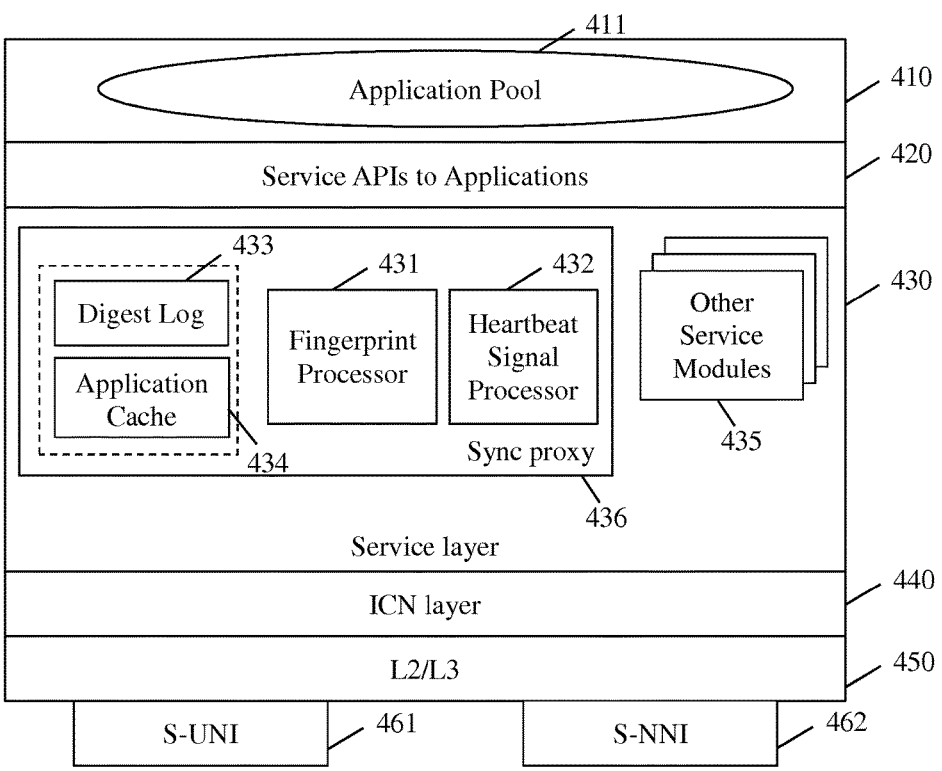
FIG. 4 is a schematic diagram of an embodiment of an architectural view of an ICN-enabled service proxy.

FIG. 4 is a schematic diagram of an embodiment of an architectural view of an ICN-enabled service proxy 400, which may be situated in a SR (e.g. SR 120) in a multi-tier conference service network (e.g. network 100). The service proxy 400 may comprise a substantially similar architecture as in a service controller 300. For example, the service proxy 400 may comprise an application layer 410, an application pool 411, a service API to application layer 420, a service layer 430, other service modules 435, an ICN layer 440, a L2/L3 layer 450, and a S-NNI layer 462, which may be substantially similar to application layer 310, application pool 311, service API to application layer 320, service layer 330, other service modules 335, ICN layer 340, L2/L3 layer 350, and S-NNI layer 360, respectively. However, the service layer 430 may comprise a sync proxy 436 instead of a sync controller 336 as in the service controller 300. In addition, the service proxy 400 may comprise an additional service user-to-network interface (S-UNI) layer 461. The S-UNI layer 461 may interface (e.g. signaling functions between networks and users) with one or more conference participants or service clients (e.g. situated in UEs 130) situated in the network.

The sync proxy 436 may serve as a control proxy for a conference. The sync proxy 436 may communicate with a service controller (e.g. service controller 300 and/or SC node 110) or more specifically a sync controller (e.g. sync controller 336). In addition, the sync proxy 436 may serve a group of service clients (e.g. situated in UEs 130) participating in the conference. For example, the sync proxy 436 may synchronize FP updates between the sync controller and the service clients. The sync proxy 436 may communicate with the service clients via the ICN layer 440, the L2/L3 layer 450, and the S-UNI layer 461. The sync proxy 436 may communicate with the sync controller via the ICN layer 440, the L2/L3 layer 450, and the S-NNI layer 462. The sync proxy 436 may comprise a FP processor 431, a heartbeat signal processor 432, a digest log 433, and an application cache 434.

The FP processor 431 may be substantially similar to FP processor 331. However, the FP processor 431 may interface with the sync controller and the service clients. For example, the FP processor 431 may receive upstream FP updates from the service clients and downstream FP updates from the sync controller. The FP processor 431 may consolidate the received upstream FP updates into a first local FP update and may send the first local FP update to the sync controller by employing a push mechanism. Similarly, the FP processor 431 may consolidate the received downstream FP updates into a second local FP update and may send the second local FP update to the service clients by employing a push mechanism.

The heartbeat signal processor 432 may be substantially similar to heartbeat signal processor 332. However, the heartbeat signal processor 432 may exchange liveliness indications (e.g. functional and connectivity statuses) with the service clients and the sync controller and may employ substantially similar mechanisms for detecting network failure at the service proxy and/or the service client and notifying application layer 410.

The digest log 433 may be substantially similar to digest log 333, but may store a local view (e.g. in the form of a proxy digest tree) of the participants that are attached to the service proxy and a most recent controller digest root received from the service controller instead of a complete view of the conference. In addition, the FP update history may correspond to the proxy digest tree (e.g. <root digest>: <controller digest root>,<proxy local digest tree>) as discussed more fully below. The application cache 434 may be substantially similar to application cache 334. In an embodiment, the FP processor 431 and the heartbeat signal processor 432 may serve one or more conferences (e.g. a chat and a VWB). In such an embodiment, the FP processor 431 may employ different digest logs 433 and/or application caches 434 for different conferences.

Figure 5:
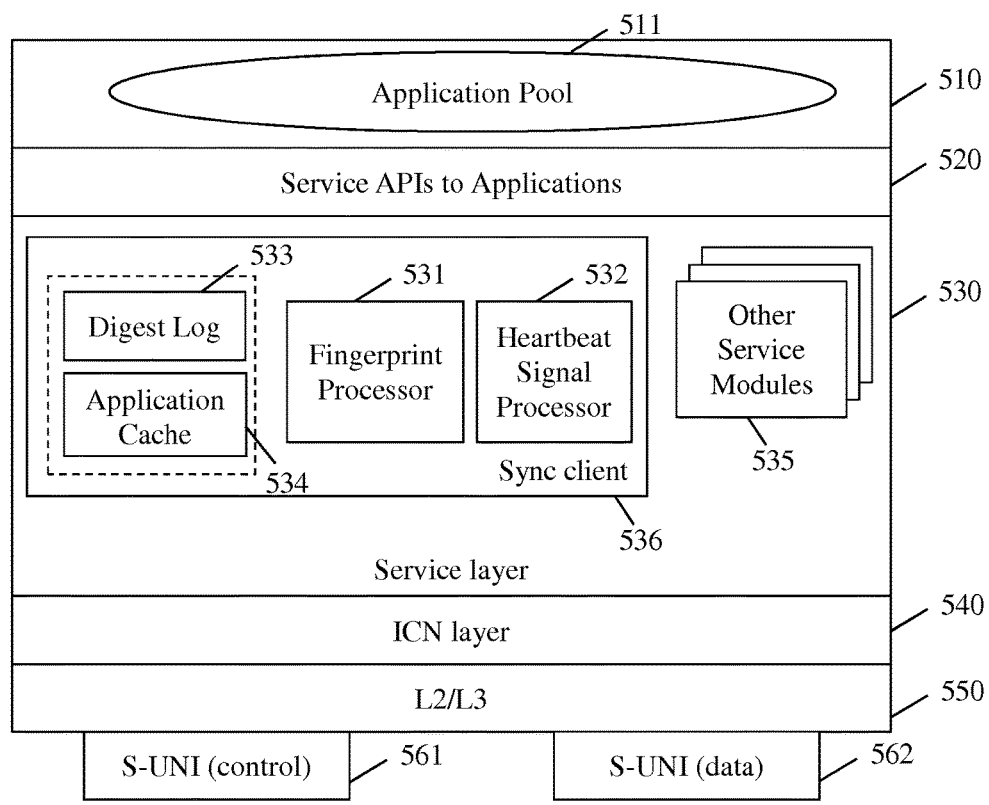
FIG. 5 is a schematic diagram of an embodiment of an architectural view of an ICN-enabled user equipment (UE).

FIG. 5 is a schematic diagram of an embodiment of an architectural view of an ICN-enabled UE 500 (e.g. UE 130), which may be situated in a multi-tier conference service network (e.g. network 100). The UE 500 may comprise a substantially similar architecture as in a service controller 300. For example, the UE 500 may comprise an application layer 510, an application pool 511, a service API to application layer 520, a service layer 530, other service modules 535, an ICN layer 540, a L2/L3 layer 550, which may be substantially similar to application layer 310, application pool 311, service API to application layer 320, service layer 330, other service modules 335, ICN layer 340, and L2/L3 layer 350, respectively. However, the service layer 430 may comprise a sync client 536 instead of a sync controller 336 as in the service controller 300. In addition, the service client 500 may comprise an S-UNI control layer 561 and an S-UNI data layer 562 instead of an S-NNI layer 360 as in the service controller 300. The S-UNI data layer 562 may exchange conference data (e.g. video, audio, rich text) with one or more conference participants (e.g. situated in UEs 130) in the network. The S-UNI control layer 561 may interface with a service proxy to exchange control signaling with the network.

The sync client 536 may be a service client configured to participate a conference. The sync client 536 may communicate with a service proxy (e.g. service proxy 400) serving the conference or more specifically a sync proxy (e.g. sync proxy 436) in the network. The sync client 536 may communicate with the service proxy via the ICN layer 540, the L2/L3 layer 550, and the S-UNI control layer 561. The sync client 536 may comprise a FP processor 531, a heartbeat signal processor 532, a digest log 533, and an application cache 534.

The FP processor 531 may be substantially similar to FP processor 331. However, the FP processor 531 may send upstream FP updates (e.g. join, leave, re-join a conference) to a service proxy and may receive downstream FP updates from the service proxy.

The heartbeat signal processor 532 may be substantially similar to heartbeat processor 332. However, the heartbeat signal processor 532 may monitor liveliness (e.g. functional statuses) of the service proxy and may employ substantially similar mechanisms for detecting network failure at the service proxy and notifying application layer 510.

The digest log 533 may be substantially similar to digest log 333, but may store a digest tree with a most recent root digest and corresponding FP update received from the attached service proxy and a history of FP updates corresponding to the root digest (e.g. <root digest>:<user FP>) as discussed more fully below. The application cache 534 may be substantially similar to application cache 334. In an embodiment, the FP processor 531 and the heartbeat signal processor 532 may serve one or more conferences (e.g. a chat and a VWB). In such an embodiment, the FP processor 531 may employ different digest logs 533 and/or different application caches 534 for different conferences.

Figure 6:
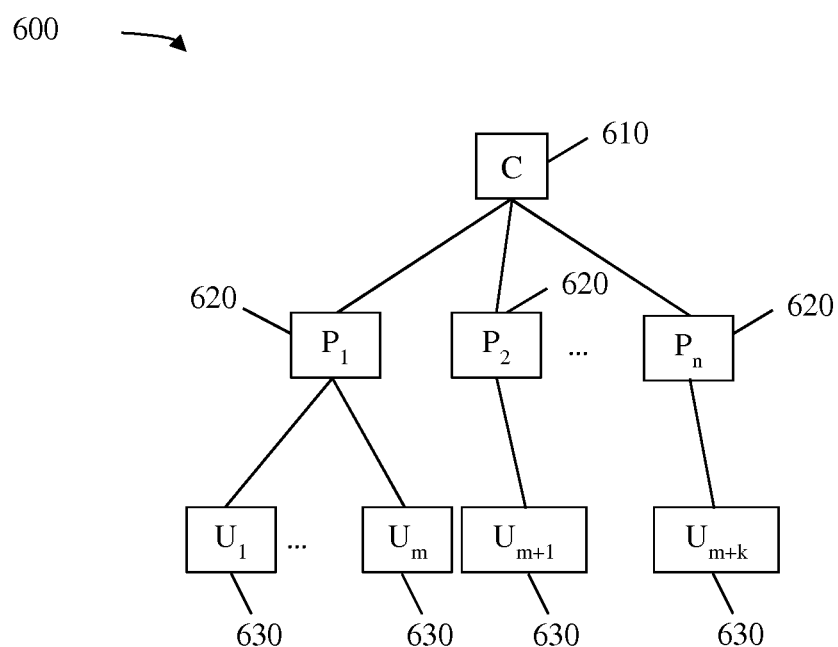
FIG. 6 is a schematic diagram of an embodiment of a hierarchical view of a multi-tier conference service network.

FIG. 6 is a schematic diagram of an embodiment of a hierarchical view of a multi-tier conference service network 600, such as network 100. Network 600 may comprise a service controller (C) 610 (e.g. service controller 300 and/or SC node 110) at a first level, a plurality of service proxies ($P_1$ to $P_n$) 620 (e.g. service proxies 400 and/or SRs 120) configured to communicate with controller (C) 610 at a second level, and a plurality of service clients ($U_1$ to $U_{m+k}$) 630 (e.g. service clients 500 and/or UEs 130) configured to communicate with service proxies 620 at a third level. For example, the service controller 610 may be logically connected to the service proxies 620 and each service proxy 620 may be connected to one or more service clients 630. The service controller 610 may interface with the service proxies 620 to manage and/or synchronize conference controls and/or signaling. Each service proxy 620 may synchronize conference controls and/or signaling between the service controller 610 and the connected service clients 630. It should be noted that the service controller 610, the service proxies 620, and/or service clients 630 may be referred to as conference components in the present disclosure.

Figure 7:
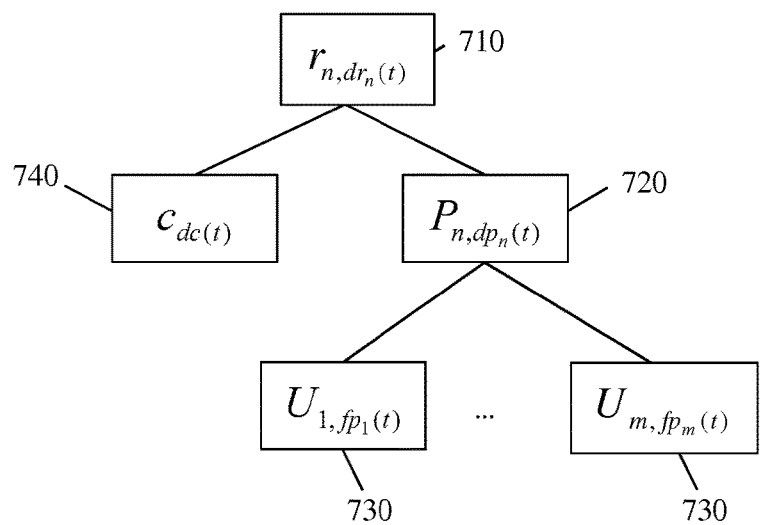
FIG. 7 is a schematic diagram of an embodiment of a digest tree at a service proxy.

FIG. 7 is a schematic diagram of an embodiment of a digest tree 700 at a service proxy (e.g. service proxy 400, 620, and/or SR 120) during a conference steady state. The digest tree 700 may be employed for recording FP updates and may be generated by a FP processor (e.g. FP processor 431) at a sync proxy (e.g. sync proxy 436). The digest tree may be stored in a proxy digest log (e.g. digest log 433). The digest tree 700 may comprise a node 710 (e.g. depicted as $r_{n,dr_n(t)}$) that branches into a node 740 (e.g. depicted as $c_{dc(t)}$) and a node 720 (e.g. depicted as $P_{n,dp_n(t)}$). The node 720 may branch into a plurality of branches with a plurality of leaf nodes 730 (e.g. depicted as $U_{1,fp_1(t)}, \ldots, U_{m,fp_m(t)}$), where the tree branches that fall under node 720 may be referred to as a local digest tree. The node 710 may be referred to as a root digest $r_n$ and may indicate a root state $dr_n(t)$ at the root digest $r_n$, where the subscript n may represent the service proxy identifier (ID). The node 720 may be referred to as a proxy local digest root $P_n$ and may indicate a local state $dp_n(t)$ at the proxy local digest root $P_n$. Each leaf node 730 may correspond to a service client $U_m$ (e.g. service client 500, 630, and/or UE 130) served by the service client and may indicate the FP update $fp_m(t)$ (e.g. published content and associating update sequence number) from the service client $U_m$, where the subscript m may represent the service client ID. The node 740 may be referred to as a controller digest root C and may indicate a global state dc(t) at the control digest root C of a service controller (e.g. service controller 300, 610, and/or SC 110) that centrally manages a conference served by the service proxy.

The service proxy may track and update the states at each node 710, 720, 730, and/or 740 by tracking updates at the service controller and the service clients. As discussed herein above, a service proxy may receive upstream FP updates from a service client and downstream FP updates from a service controller. When the service proxy receives an upstream FP update (e.g. $U_{m,fp_m(t)}$) from a service client m, the service proxy may update the node 730 that corresponds to the service client m according to the received upstream FP update. In addition, the service proxy may update the root state $dr_n(t)$ as well as the local state $dp_n(t)$ for every received upstream FP update. When the service proxy receives a downstream FP update (e.g. comprising a global state dc(t)) from the service controller, the service proxy may update the node 740 according to the received downstream FP update. In addition, the service proxy may update the root state $dr_n(t)$ for every received downstream FP update. It should be noted that the states at nodes 710, 720, 730, and 740 may be updated at different time instants. In addition, the service proxy may store each received FP update in a digest log history in the digest log and may purge old entries after a predetermined time and/or based on the size of the digest log history.

The root state $dr_n(t)$ and the local state $dp_n(t)$ at a service proxy n and the global state dc(t) at a service controller at a time instant t may be computed as shown below:

$$dp_n(t) = \sum_{i=1}^{m} fp_i(t) \quad (1)$$
$$dr_n(t) = dc(t) + dp_n(t)$$
$$dc(t) = \sum_{j=1}^{n} dp_j(t)$$

where $$\sum_{i=1}^{m} fp_i(t)$$

may represent the total number of upstream FP updates sent by the service clients attached to the service proxy n at time t and $$\sum_{j=1}^{n} dp_j(t)$$

may represent the total number of upstream

FP updates sent by all service proxies (e.g. locally by service proxy n and all other remote service proxies serving the conference). It should be noted be that the global state dc(t) may be computed by the service controller, the root state $dr_n(t)$ and the local state $dp_n(t)$ may be computed by the service proxy n.

In an embodiment, a service controller (e.g. service controller 300, 610, and/or SC node 110) may maintain a controller digest log (e.g. digest log 333) to track updates at every sync proxy and every sync client in a conference. For example, the service controller may generate an entry in the digest log history for each upstream FP update received from a service proxy, update the global state dc(t), and update the controller digest tree accordingly as discussed more fully below. It should be noted that the service controller may maintain a global record of all service proxies and all service clients (e.g. published FPs)

In an embodiment, a service client (e.g. service client 500, 630, and/or UE 130) may maintain a digest log (e.g. digest log 533) to track updates at a connected service proxy. For example, the service client may generate an entry in the digest log history for each downstream FP update (e.g. comprising a root state $dr_n$ (t) and a user FP $U_{m,fp_m(t)}$) received from the service proxy and cache the root state $dr_n(t)$ and the user FP $U_{m,fp_m(t)}$ in the digest tree. As such, the disclosed multi-tier conference service control architecture may offload the maintenance and tracking of conference controls from the service clients when compared to a server-centric architecture and/or a server-less architecture.

Figure 8:
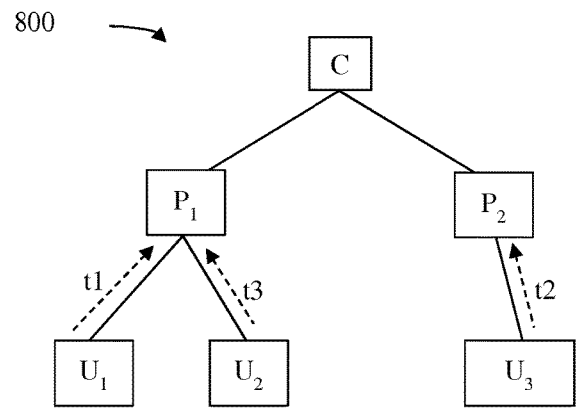
FIG. 8 is a schematic diagram of an embodiment of a conference formation.

Each digest tree may represent a snapshot of a localized view of the conference at a specified time. Each digest tree may comprise a different tree structure at a particular time instant. FIGS. 8-11 may illustrate an embodiment of a digest log at a service controller, a service proxy, and a service client during a conference. FIG. 8 is a schematic diagram of an embodiment of a conference 800 formation. Conference 800 may comprise a service controller C (e.g. service controller 300 and/or SC node 110), two service proxies P1 and P2 (e.g. service proxies 400 and/or SRs 120), and three conference participants U1, U2, and U3 (e.g. service clients 500 and/or UEs 130). For example, participant U1 may join conference 800 via service proxy P1 at time instant t1, participant U3 may join conference 800 via service proxy P2 at time instant t2, and participant U2 may join conference 800 via service proxy P1 at time instant t3.

Figure 9:
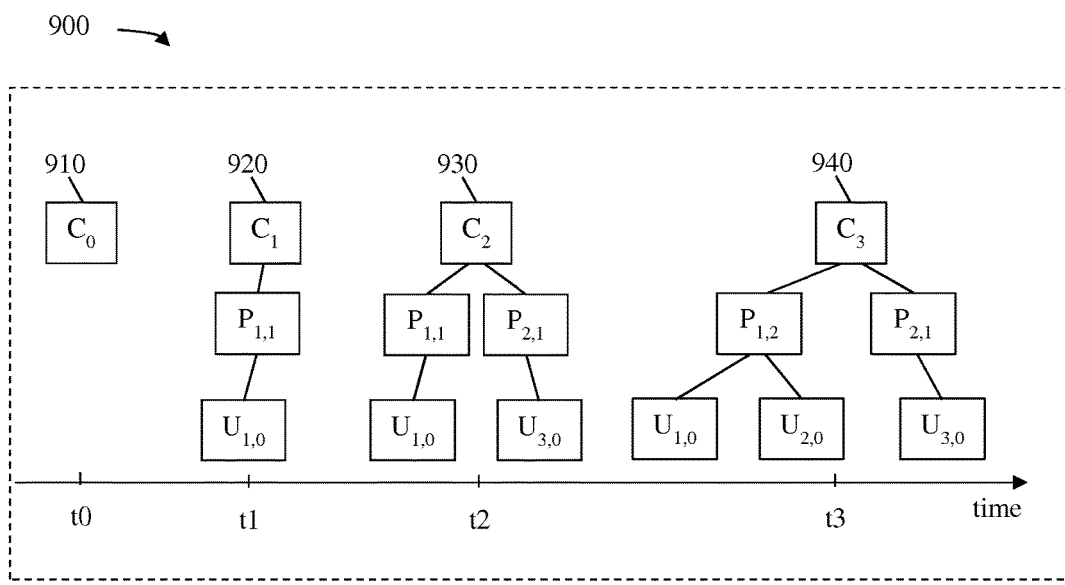
FIG. 9 is a schematic diagram of an embodiment of a digest tree log at a service controller.

FIG. 9 is a schematic diagram of an embodiment of digest tree log 900 at a service controller (e.g. service controller 300 and/or SC node 110) during a conference 800. Digest tree log 900 may illustrate digest trees 910, 920, 930, and 940 at four different time instants during the conference. For example, digest tree 910 may illustrate a conference view at a beginning time t0 of the conference. Digest tree 920 may illustrate a conference view at a time instant t1 when a participant U1 joins the conference via a service proxy P1. Digest tree 930 may illustrate a conference view at a time instant t2 when a participant U3 joins the conference via a service proxy P2. Digest tree 940 may illustrate a conference view at a time instant t3 when a participant U2 joins the conference via the service proxy P1. Digest tree log 900 may comprise three levels, a root level, a middle level, and a leaf level. For example, the root level may correspond to a controller digest root $c_{dc}$ with a global state dc. The middle level may correspond to proxy local digest roots $P_{n,dp_n}$ at each service proxy n with a local state $dp_n$. The leaf level may correspond to each client $U_{m,fp_m}$ with a user FP $fp_m$. As shown in digest tree log 900, when a participant joins the conference via a service proxy, the corresponding local state $dp_n$ at $P_{n,dp_n}$, as well as the global state dc may be incremented by one. It should be noted that the local state $dp_n$ may be updated by the service proxy and the global state dc may be updated by the service controller.

Figure 10:
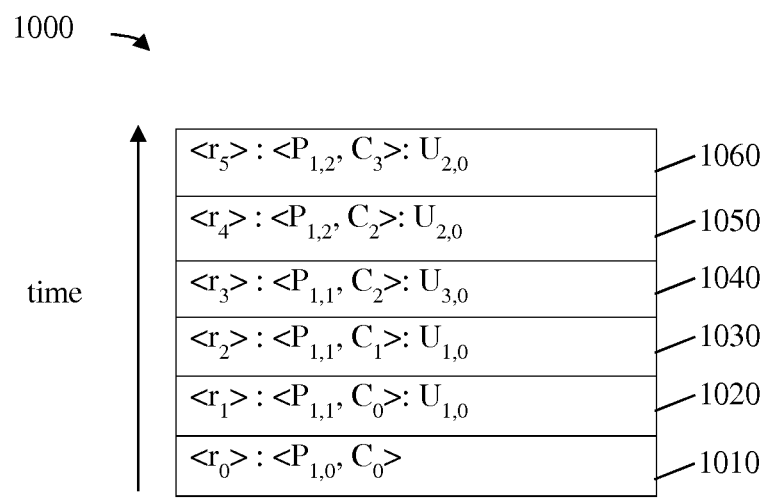
FIG. 10 is a table of an embodiment of a digest history log at a service proxy.

FIG. 10 is a table of an embodiment of digest history log 1000 at a service proxy (e.g. service proxies 400 and/or SRs 120) during a conference 800. For example, the digest history log 1000 may correspond to a digest history recorded at a service proxy P1. Digest history log 1000 may represent a controller digest root, a proxy local digest root, and a service client, may employ substantially similar notations as in digest tree log 900, and may represent a root digest as $r_{dr}$ with a root state dr. The digest history log 1000 may be illustrated as entries 1010, 1020, 1030, 1040, 1050, and 1060 in FIG. 10. It should be noted that the entries 1020 and 1050 may be generated after receiving an upstream FP update from a service client U1 and U2, respectively, whereas the entries 1030, 1040, and/or 1060 may be generated after receiving downstream FP updates from the service controller. In addition, the time instants at which each entry is updated may not be synchronized to a digest history log at a service controller.

For example, entry 1010 may correspond to the beginning of conference 800. Entry 1020 may be generated when service proxy P1 receives a conference join from service client U1. Entry 1030 may be generated when service proxy P1 receives a downstream FP update from the service controller indicating the joining of service client U1 at the service controller. Entry 1040 may be generated when service proxy P1 receives a downstream FP update from the service controller indicating the joining of service client U3 (e.g. via service proxy P2) at the service controller. Entry 1050 may be generated when service proxy P1 receives a conference join from service client U2. Entry 1060 may be generated when service proxy P1 receives a downstream FP update from the service controller indicating the joining if service client U2 at the service controller.

Figure 11:
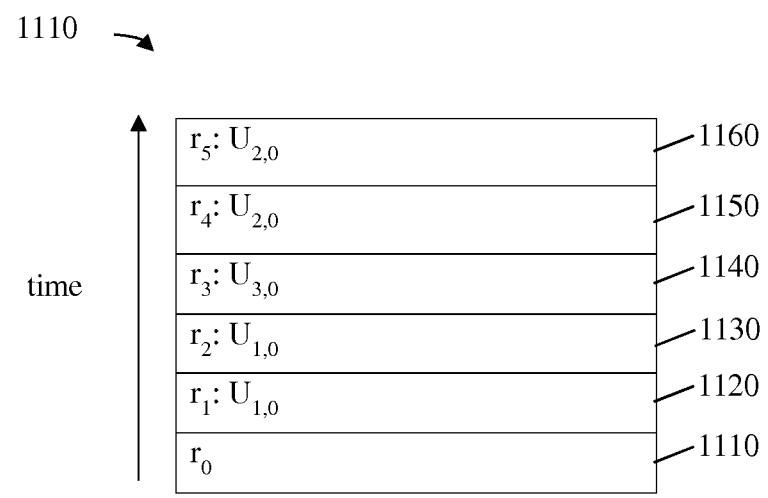
FIG. 11 is a table of an embodiment of a digest history log at a service client.

FIG. 11 is a table of an embodiment of digest history log 1100 at a service client (e.g. service clients 500 and/or UEs 130) during a conference 800. For example, the digest history log 1100 may correspond to a digest history recorded at a service client U1. Digest history log 1100 may represent a proxy local digest root and a service client FP and may employ substantially similar notations as in digest history log 1000. The digest history log 1100 may be illustrated as entries 1110, 1120, 1130, 1140, 1150, and 1160 in FIG. 11. It should be noted that the entries 1110, 1120, 1130, 1140, 1150, and 1160 may generated after receiving downstream FP updates from a service proxy 1 as discussed more fully below. For example, service proxy P1 may send a downstream FP update to service client U1 after each digest update at service proxy P1. Thus, the entries 1110, 1120, 1130, 1140, 1150, and 1160 may be generated after receiving downstream FP updates from service proxy P1 corresponding to proxy digest updated entries 1010, 1020, 1030, 1040, 1050, and 1060, respectively.

Figure 12:
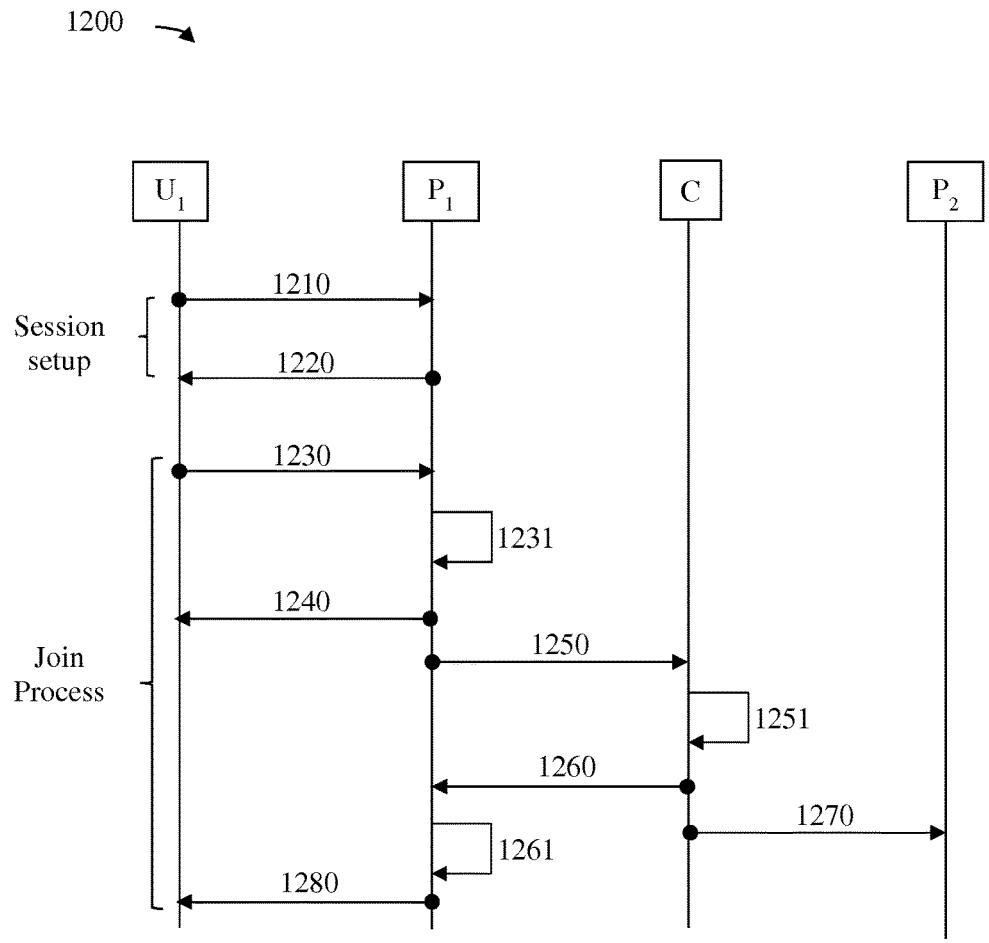
FIG. 12 is a protocol diagram of an embodiment of a conference bootstrap method.

FIG. 12 is a protocol diagram of an embodiment of a conference bootstrap method 1200 in multi-tier conference service network (e.g. network 100). Method 1200 may be implemented between a service controller C (e.g. service controller 300 and/or SC node 110), service proxies P1 and P2, (e.g. service proxies 400 and/or SRs 120), and a participant U1 (e.g. service client 500 and/or UE 130). Method 1200 may represent a root digest, a controller digest root, and a proxy local digest root by employing substantially similar notations as described herein above. However, method 1200 may represent a service client's FP by employing a notation of $U_m$-$FP_k$ for clarity, where $U_m$ may represent a service client m and $FP_k$ may represent the FP published by the service client. Method 1200 may begin with a first participant U1 joining a conference. For example, at step 1210, participant U1 may send a connect request message to service proxy P1 to request a conference session. At step 1220, service proxy P1 may respond by sending a connect reply message to participant U1 to complete the conference setup.

At step 1230, participant U1 may send (e.g. via a push) a join update message to service proxy P1, where the join update message may comprise the participant U1's signature profile (e.g. $U_1$-$FP_0$). At step 1231, after receiving the join update message, service proxy P1 may update a digest tree and a FP history in a proxy digest log (e.g. digest log 433) at service proxy P1 according to the received join update message. For example, the FP history may comprise the following entries:

Last entry: $<r_{1,0}>:<P_{1,0},C_0>$
Current entry: $<r_{1,1}>:<P_{1,1},C_0>:<U_1$-$FP_0>$ where the root state dr and the local state dp may each be incremented by one.

At step 1240, service proxy P1 may send a first digest update message (e.g. $r_{1,1}/U_1$-$FP_0$) to participant U1. At step 1250, in response to the join update message, service proxy P1 may send (e.g. via a push) the join update message (e.g. with updated state $P_{1,1}/U_1$-$FP_0$) to the service controller C. At step 1251, after receiving the join update message, the service controller C may update a digest tree and a FP history in a controller digest log (e.g. digest log 333) at the service controller C according to the received join update message. For example, the FP history may comprise the following entries:

Last entry (P1): $<C_0>:<P_{1,0}>$
Last entry (P2): $<C_0>:<P_{2,0}>$
Current entry (P1): $<C_1>:<P_{1,1}>:<U_1$-$FP_0>$
Current entry (P2): $<C_1>:<P_{2,0}>:<FP_0>$ where the global state dc may be incremented by one.

After updating the controller digest log, service controller C may send a second digest update message (e.g. $C_1/P_{1,1}/U_1$-$FP_0$) to service proxy P1 at step 1260 and a third digest update message (e.g. $C_1/P_{2,0}/U_1$-$FP_0$) to service proxy P2 at step 1270. At step 1261, in response to the second digest update message, service proxy P1 may update the proxy digest log. For example, the FP history may comprise the following entries:

Last entry: $<r_{1,1}>:<P_{1,1},C_0>:<U_1$-$FP_0>$
Current entry: $<r_{1,2}>:<P_{1,1},C_1>:<U_1$-$FP_0>$ where the root state dr may be incremented by one and the global state dc may be recorded as indicated in the second digest update message.

At step 1280, after updating the proxy digest log, service proxy P1 may send a fourth digest update message (e.g. $r_{1,2}/U_1$-$FP_0$) to participant U1. It should be noted that the service proxy P1 may send the join update messages to the service controller C by employing a push mechanism.

Figure 13:
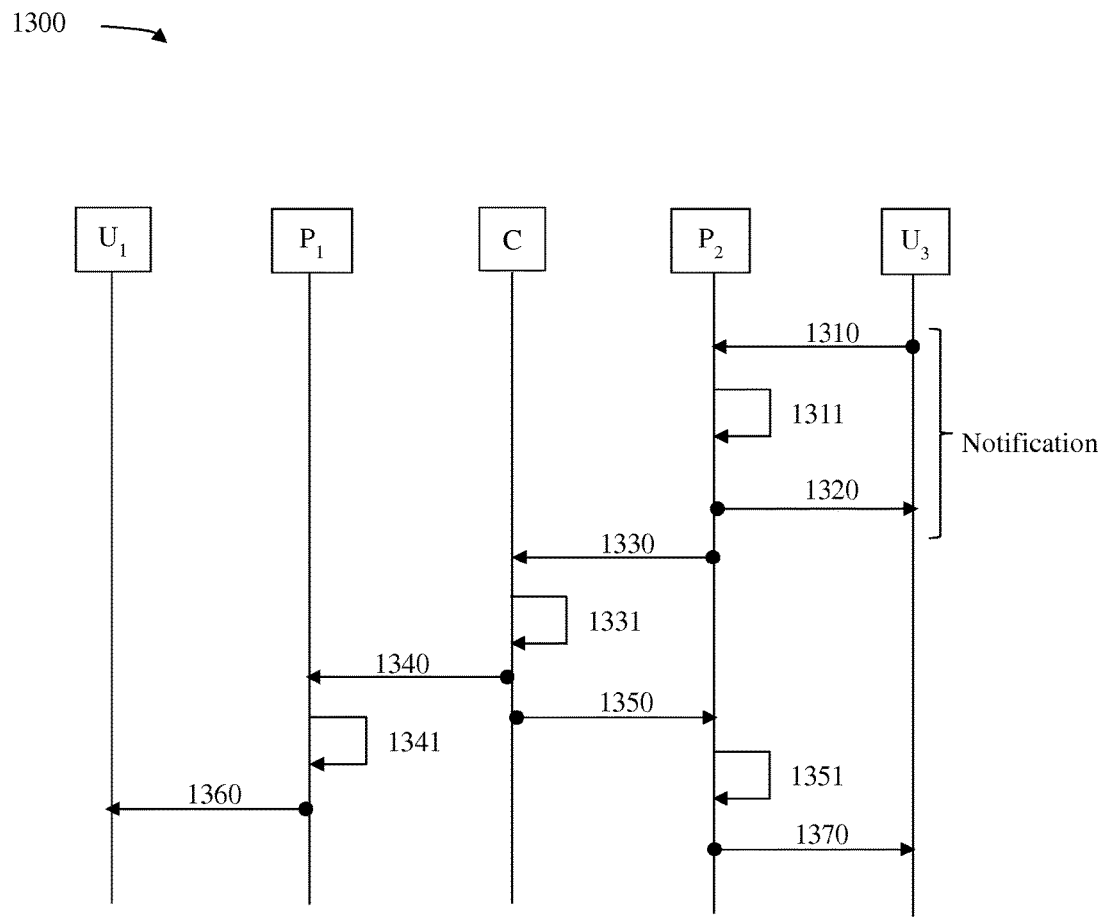
FIG. 13 is a protocol diagram of an embodiment of a conference synchronization method.

FIG. 13 is a protocol diagram of an embodiment of a conference synchronization method 1300. Method 1300 may be implemented between a service controller C (e.g. service controller 300 and/or SC node 110), service proxies P1 and P2, (e.g. service proxies 400 and/or SRs 120), and participants U1 and U3 (e.g. service clients 500 and/or UEs 130) during a notification process, where participant U1 may be connected to service proxy P1 and participant U3 may be connected to service proxy P2. The notification process may include join, log off, re-join, and/or other conference control notifications. Method 1300 may represent a controller digest root, a root digest, a proxy local digest root, and a service client's FP by employing substantially similar notations as method 1200 described herein above. Method 1300 may begin when a conference is in a steady state. For example, service controller C may comprise a global state n and the controller digest root may be represented as $C_n$. Service proxy P1 may comprise a root state p and a local state m. The root digest and the proxy local digest root at the service proxy P1 may be represented as $r_{1,p}$ and $P_{1,m}$, respectively. Service proxy P2 may comprise a root state i and a local state k. The root digest and the proxy local digest root at the service proxy P2 may be represented as $r_{2,i}$ and $P_{2,k}$, respectively. Method 1300 may be suitable for synchronizing states upon an injection of a new notification message (e.g. join, leave, rejoin, and/or other control update messages), for example, from participant U3.

At step 1310, participant U3 may send (e.g. via a push) a notification message to service proxy P2, where the notification message may comprise participant U3's signature profile (e.g. $U_3$-$FP_j$). At step 1311, in response to the notification message, service proxy P2 may update a digest tree and a FP history in proxy digest log (e.g. digest log 433) at service proxy P2 according to the notification message. For example, the FP history may comprise the following entries:

Last entry: $<r_{2,i}>$:$<P_{2,k},C_n>$
Current entry: $<r_{2,i+1}>$:$<P_{2,k+1},C_n>$:$<U_3$-$FP_j>$ where the root state dr and the local state dp may each be incremented by one.

At step 1320, service proxy P2 may send a first digest update message (e.g. $r_{2,i+1}/U_3$-$FP_j$) to participant U3. At step 1330, in response to the received notification message, service proxy P2 may send (e.g. via a push) the notification message (e.g. with updated state $P_{2,k+1}/U_3$-$FP_j$) to service controller C.

At step 1331, service controller C may update a digest tree and a FP history in controller digest log (e.g. digest log 333) at the service controller C according to the received notification message. For example, the FP history may comprise the following entries as shown below:

Last entry (P1): $<C_n>$:$<P_{1,m}>$
Last entry (P2): $<C_n>$:$<P_{2,k}>$
Current entry (P1): $<C_{n+1}>$:$<P_{1,m}>$:$<U_3$-$FP_j>$
Current entry (P2): $<C_{n+1}>$:$<P_{2,k+1}>$:$<U_3$-$FP_j>$ where the global state dc may be incremented by one.

After updating the controller digest log, service controller C may send a second digest update message (e.g. $C_{n+1}/P_{1,m}/U_3$-$FP_j$) to service proxy P1 at step 1340 and a third digest update message (e.g. $C_{n+1}/P_{2,k+1}/U_3$-$FP_j$) to service proxy P2 at step 1350.

At step 1341, in response to the second digest update message, service proxy P1 may update a digest tree and a FP history in a proxy digest log at service proxy P1. For example, the FP history may comprise the following entries as shown below:

Last entry: $<r_{1,p}>$:$<P_{1,m},C_n>$
Current entry: $<r_{1,p+1}>$:$<P_{1,m+1},C_{n+1}>$:$<U_3$-$FP_j>$ where the root state dr may be incremented by one and the global state dc may be recorded as indicated in the second digest update message.

At step 1360, after updating service proxy P1 digest log, service proxy P1 may send a fourth digest update message (e.g. $r_{1,p+1}/U_3$-$FP_j$) to participant U1. At step 1351, in response to the third digest update message, service proxy P2 may update service proxy P2 digest log. For example, the FP history at the service proxy P2 digest log may comprise the following entries:

Last entry: $<r_{2,i+1}>$:$<P_{2,k+1},C_n>$:$<U_3$-$FP_j>$
Current entry: $<r_{2,i+2}>$:$<P_{2,k+1},C_{n+1}>$:$<U_3$-$FP_j>$ where the root state dr may be incremented by one and the global state dc may be recorded as indicated in the third digest update message.

At step 1370, after updating service proxy P2 digest log, service proxy P2 may send a fifth digest update message (e.g. $r_{2,i+2}/U_3$-$FP_j$) to participant U3. It should be noted that the sending of all notification messages may employ a push mechanism.

Figure 14:
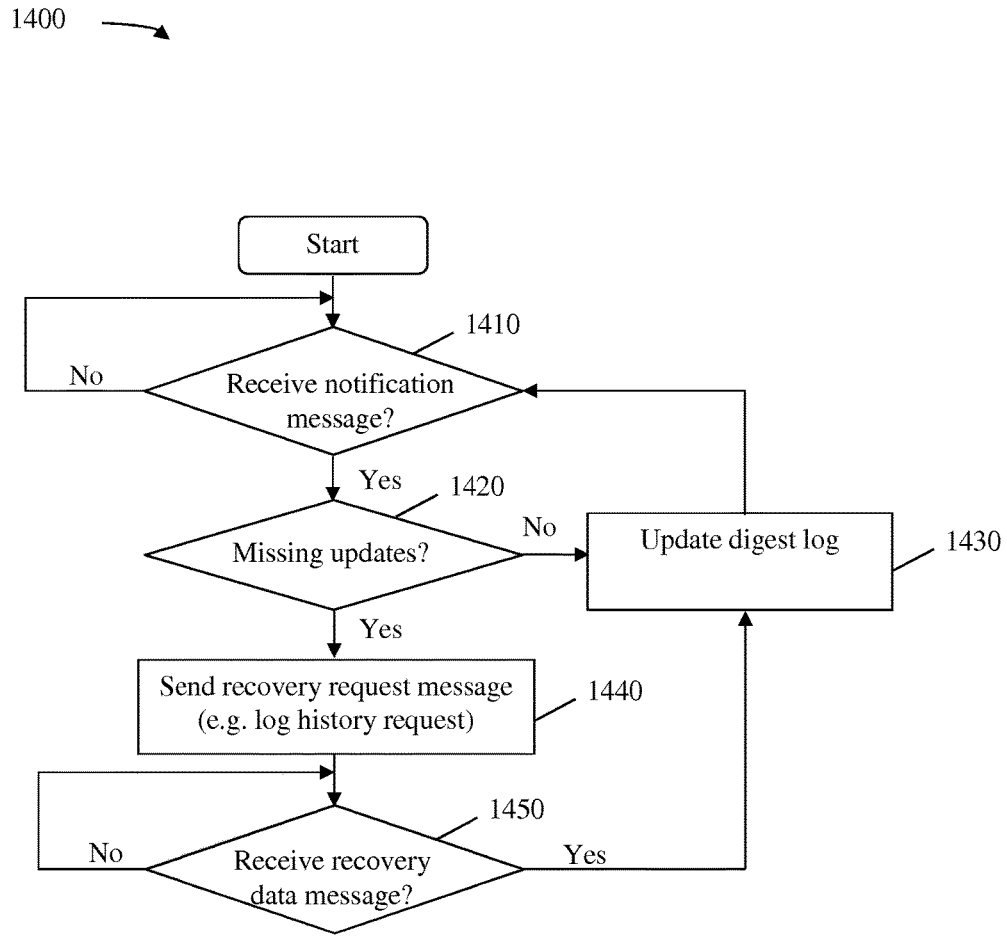
FIG. 14 is a flowchart of an embodiment of a conference recovery method.

FIG. 14 is a flowchart of an embodiment of a conference recovery method 1400. Method 1400 may be implemented at any conference component, such as a service controller (e.g. service controller 300 and/or SC node 110), a service proxy, (e.g. service proxies 400 and/or SRs 120), and/or a service client (e.g. service clients 500 and/or UEs 130). Method 1400 may begin a conference component recovers from a temporary network interruption (e.g. less than a few minutes), for example, due to network failure, link congestions, and/or other network faulty conditions. At step 1410, method 1400 may wait for a notification message from a connected component. For example, the connected component for a service client may be a service proxy, the connected component for a service proxy may be a service client and/or a service controller, and the connected component for a service controller may be a service proxy.

Upon receiving the notification message, method 1400 may proceed to step 1420. At step 1420, method 1400 may determine whether there are missing updates (e.g. occurred during the temporary interruption) from the connected component. For example, method 1400 may compare a last state of the connected component indicated in the notification message to a most recent recorded state in a digest log (e.g. digest log 333, 433, and/or 533). If there is no missing update (e.g. the received last state and the most recent recorded state are identical), then method 1400 may proceed to step 1430. At step 1430, method 1400 may update the digest log and return to step 1410.

If there are one or more missing updates (e.g. the received last state and the most recent recorded state are different), method 1400 may proceed to step 1440. At step 1440, method 1400 may send a recovery request message to the connected component, for example, indicating the most recent recorded state and the received current state (e.g. gap of missing updates). At step 1450, method 1400 may wait for a recovery data message. Upon receiving the recovery data message, method 1400 may continue to step 1430 to update the digest log. Method 1400 may be repeated for the duration of a conference.

In an embodiment, when a service controller (e.g. service controller 300 and/or SC node 110), service proxies (e.g. service proxies 400 and/or SRs 120), and service clients (e.g. service clients 500 and/or UEs 130) sends a notification message, the service controller, the service proxies, and the service clients may synchronize conference controls and signaling (e.g. FP updates and/or states), for example, via method 1300. Some examples of notifications may include join notifications, log off notifications, re-join notifications, and/or any other types of notifications. A join notification process may be initiated by a service client joining a conference for the first time and may include steps, such as login authorization at a login server, publishing of a login message to the network, and/or sending of login notification.

A log off notification process may be initiated by a service client intentionally leaving (e.g. sending a log off message) a conference and may include steps, such as log off authorization at a login server, publishing of log off message to the network, and/or sending of log off notification. When the service client sends a log off message to a service proxy, the service proxy may delete a corresponding leaf node in the service proxy's digest tree (e.g. digest tree 700), recompute the digest root of the digest tree, and notify the service controller. When the service controller receives the notification, the service controller may remove a corresponding leaf node from the service controller's digest tree (e.g. digest trees 910, 920, 930, and/or 940), recompute the controller digest root, and push the updates to all connected service proxies. The conference session may be closed after the log process, for example, the service client may send a close request message to the service proxy and the service proxy may respond with a close reply message.

A re-join notification process may occur when a service client intentionally leaving a conference (e.g. a log off notification) and then subsequently re-joining the conference. After the service proxy receives a log off notification from the service client, the service proxy and the service controller may preserve some information (e.g. FP updates and/or states) of the leaving service client for a predetermined period of time (e.g. a re-join timeout interval). When the service client re-joins the conference within the re-join timeout interval, the service proxy and the service controller may resume the last state of the service client just prior to the log off process. However, when the service client joins the conference after the re-join timeout interval, the joining process may be substantially similar to a first-time join process.

A recovery process may occur after a network (e.g. network 100) experiences a temporary interruption and/or disconnection. For example, a conference component (e.g. a sync controller 336, a sync proxy 436, and/or a sync client 536) may continue to send heartbeat signals during the interruption, but may not receive heartbeat signals from a connected component. When the duration of the interruption is within a predetermined timeout interval (e.g. a disconnect timeout interval), each conference component may maintain conference states in the digest log (e.g. at digest log 333, 433, and/or 533) and may continue with the last state (e.g. prior to the interruption) after recovering from the interruption. After recovery, each component may detect missing updates (e.g. occurred during the interruption) from a connected component and may request digest log history from the connected component (e.g. via method 1400).

However, when the network experiences a long-term network failure (e.g. longer than the disconnect timeout interval), a disconnection process may be performed at the service controller, the service proxy, and/or the service client. For example, when the network disruption occurs between a service proxy and a service client, the service client may be disconnected and may be handled with substantially similar mechanisms as a log off notification process. When the network disruption occurs between a service proxy and a service controller, the service controller may delete the digest tree branch that falls under the service proxy including the service clients that are connected to the service proxy, recompute the controller digest root, and push the updates to all connected service proxies.

In an embodiment of a multi-tier conference service network (e.g. network 100), conference controls and/or signaling exchanged between a service controller, service proxies, and/or service clients in a control plane (e.g. control paths 191 and 192) may include session setup and/or close messages, service-related synchronization messages, heartbeat messages, and/or recovery messages. For example, the session setup and/or close messages, service-related messages, and/or recovery messages may be initiated and/or generated by a FP processor (e.g. FP processor 331, 431, and/or 531) at a sync controller (e.g. sync controller 336), a sync proxy (e.g. sync proxy 436), and/or a sync client (e.g. sync client 536). The messages may be in the form of an interest packet and/or a data packet structured according to the ICN protocol. For example, an interest packet may be employed for sending a notification message and may employ a push mechanism. Some interest packets may be followed by data packets (e.g. response messages).

Figure 15:
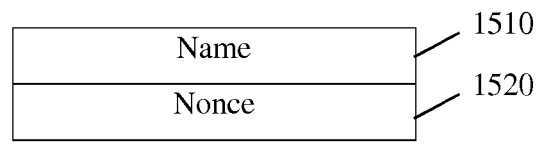
FIG. 15 is a schematic diagram of an embodiment of an ICN protocol interest packet.

FIG. 15 is a schematic diagram of an embodiment of an ICN protocol interest packet 1500. The packet 1500 may comprise a name field 1510 and a nonce field 1520. The name field 1510 may be a name-based identifier that identifies an information object. The nonce field 1520 may be a numerical value that is employed for security, authentication, and/or encryption. For example, the nonce field 1520 may comprise a random number. The packet 1500 may be sent via a push mechanism.

In an embodiment, conference service control messages, such as session setup and/or close messages, service-related notification messages, heartbeat messages, and/or recovery messages, may be sent as ICN protocol interest packets 1500. The name field 1510 in each packet 1500 may begin with a routing prefix (e.g. <Routing-Prefix>), which may be name-based and may identify a recipient of the interest packet 1510. The following list examples of routing prefixes:

TABLE 1

Names for Routing Prefix

| Recipient | Names for routing prefix |
|---|---|
| Sync controller | <SC-ID> |
| Sync proxy | <SR-ID>:<ProxyID> |
| Sync client | <ISP>:<DeviceID> |

The SC-ID may be a sync controller ID that identifies a sync controller (e.g. sync controller 336) in a network (e.g. network 100). The SR-ID may be a service router ID that identifies a SR (e.g. SR 120) in the network and the ProxyID may be a sync proxy ID that identifies the sync proxy (e.g. sync proxy 436) situated in the SR (e.g. SR may host one or more sync proxies). The ISP may be the name of an ISP that provides Internet service to a conference participant (e.g. UE 130). The DeviceID may be a UE ID or a sync client ID that identifies the conference participant (e.g. sync client 536 situated in the UE 130).

In a session setup and/or close process, a sync client may send session setup and/or close messages to a sync proxy requesting to connect to and/or disconnect from a conference, respectively. For example, an interest packet for a session setup and/or close message may comprise a name field 1510 as shown below:

<Routing-Prefix>:<ServiceID>:<ClientID>:<Msg-Type> where Routing-Prefix may be the routing prefix for a sync proxy as shown in Table 1 herein above. The ServiceID, ClientID, and Msg-Type may indicate information as shown below:

TABLE 2

Descriptions of name identifiers for session setup
and/or close messages (sync client to sync proxy)

| Names | Descriptions |
|---|---|
| ServiceID | Service name (e.g. chatroom-name) |
| ClientID | Sync client ID |
| Msg-Type | Connect (e.g. session setup) or disconnect (e.g. session close) |

In a notification process, a sync client may send upstream notification messages to a sync proxy requesting to join, leave, and/or re-join a conference, and/or other notification information. For example, an interest packet for an upstream notification message from a sync client to a sync proxy may comprise a name field 1510 as shown below:

<Routing-Prefix>:<ServiceID>:<Msg-Type>:<dr>:<User-FP> where Routing-Prefix may be the routing prefix for a sync proxy as shown in Table 1 herein above. The ServiceID, Msg-Type, dr, and User-FP may indicate information as shown below:

TABLE 3

Descriptions of name identifiers for notification messages (sync client to sync proxy)

| Names | Descriptions |
|---|---|
| ServiceID | Service name (e.g. chatroom-name) |
| Msg-Type | Connect (e.g. session setup) or disconnect (e.g. session close) |
| dr | Current root state logged at the sync client's digest log (e.g. digest log 533) |
| User-FP | Content of participant's FP. |

It should be noted that User-FP may be generated at a UE (e.g. UE 130) by an application (e.g. a chat application) situated in in an application pool (e.g. application pool 511) at a service client (e.g. service client 500). The following shows an example of a User-FP:

<ISP>:<SR-ID>:<ServiceID>:<Service-AccountID>: <msg-Seq> where ISP, SR-ID, ServiceID may be as described herein above, Service-AccountID may correspond to the UE account ID in the ISP network, and msg-Seq may include the participant's signature information, credential information, security parameters, and/or an associating update sequence number. For example, the update sequence number may be employed for identifying the User-FP content.

In response to notifications received from a sync client, a sync proxy may send upstream notification messages to a sync controller to update the sync controller of the joining, leaving, and/or re-joining of sync clients, and/or other sync clients' published information. For example, an interest packet for an upstream notification message from a sync proxy to a sync controller may comprise a name field 1510 as shown below:

<Routing-Prefix>:<ServiceID>:<Msg-Type>: <ProxyID>:<dp_pre>:<dp_curr>:<User-FP> where Routing-Prefix may be the routing prefix for a sync controller as shown in Table 1 herein above. The ServiceID, Msg-Type, ProxyID, dp_pre, dp_curr, and User-FP may indicate information as shown below:

TABLE 4

Descriptions of name identifiers for notification messages (sync proxy to sync controller)

| Names | Descriptions |
|---|---|
| SC-ID | sync controller (e.g. sync controller 336) ID |
| ServiceID | Service name (e.g. chatroom-name) |
| Msg-Type | Join, leave, re-join a conference, and/or other notification messages |
| ProxyID | Sync proxy (e.g. sync proxy 436) ID |
| dp_pre | Last local state logged at the sync proxy's digest log (e.g. digest log 433) |
| dp_curr | Updated local update at the sync proxy |
| User-FP | FP content of a sync client (e.g. who initiated a join, leave, re-join and/or other notifications) |

In response to notifications received from a sync proxy, a sync controller may send downstream notification messages to connected sync proxies (e.g. unicast to each sync proxy) to update the sync proxies of the joining, leaving, and/or re-joining of sync clients (including sync clients connecting to other sync proxy), and/or other sync clients' published information. For example, an interest packet for a downstream notification message from a sync controller to a sync proxy may comprise a name field 1510 as shown below:

<Routing-Prefix>:<ServiceID>:<Msg-Type>:<dc_pre>: <dc_curr>:<dp_curr><User-FP> where Routing-Prefix may be the routing prefix for a sync proxy as shown in Table 1 herein above. The ServiceID, Msg-Type, dc_pre, dc_curr, dp_curr, and User-FP may indicate information as shown below:

TABLE 5

Descriptions of name identifiers for notification messages (sync controller to proxy)

| Names | Descriptions |
|---|---|
| ServiceID | Service name (e.g. chatroom-name) |
| Msg-Type | Join, leave, re-join a conference, and/or other notification messages |
| dc_pre | Last global state logged at the sync controller's digest log (e.g. digest log 333) |
| dc_curr | Updated global state |
| dp_curr | Current local state associated with the ProxyID logged at the sync controller |
| User-FP | FP content of a sync client (e.g. who initiated a join, leave, re-join and/or other notifications via a connected proxy) |

In response to notifications received from a sync controller, a sync proxy may send may send downstream notification messages to a sync client (e.g. unicast) to update the sync client of the joining, leaving, and/or re-joining of sync clients (including sync clients connecting to other sync proxy), and/or other sync clients' published information. For example, an interest packet for a downstream notification message from a sync proxy to a sync client may comprise a name field 1510 as shown below:

<Routing-Prefix>:<ServiceID>:<Flag>: <dr_pre><dr_curr>:<User-FP> where Routing-Prefix may be the routing prefix for a sync client as shown in Table 1 herein above. The ServiceID, Flag, dr_pre, dr_curr, and User-FP may indicate information as shown below:

TABLE 6

Descriptions of name identifiers for notification messages (sync proxy to sync client)

| Names | Descriptions |
|---|---|
| ServiceID | Service name (e.g. chatroom-name) |
| Flag | Join, leave, re-join a conference, and/or other notification messages |
| dr_pre | Last root state logged at the sync proxy's digest log (e.g. digest log 433) |
| dr_curr | Updated root state |
| User-FP | FP content of a sync client (e.g. who initiated a join, leave, re-join and/or other notifications via a connected proxy) |

Heartbeat messages may be sent by a sync controller, a sync proxy, and/or a sync client to indicate liveliness (e.g. functional indicator and/or connectivity). For example, a sync controller may send heartbeat messages to connected sync proxies, a sync proxy may send heartbeat messages to a sync controller as well as connected sync clients, and a sync client may send heartbeat messages to a connected sync proxy. For example, an interest packet for a heartbeat message may comprise a name field 1510 as shown below:

<Routing-Prefix>:<OriginatorID>:<Flag>:<Sequence_no> where Routing-Prefix may vary depending the intended recipient as shown in Table 1 herein above. The OriginatorID, Flag, and sequence_no may indicate information as shown below:

TABLE 7

Descriptions of name identifiers for heartbeat messages

| Names | Descriptions |
|---|---|
| OriginatorID | Depend on the sender:<br>Sync controller: <SC-ID><br>Sync client: <ClientID> |
| Flag | Hello, Alive, etc. |
| Sequence_no | Sequence number of the heartbeat message |

It should be noted that heartbeat messages may be sent periodically or driven by predetermined events. In some embodiments, a recipient of a heartbeat message may send a confirmation message (e.g. as a data packet as discussed more fully below).

A recovery process may refer to a network recovery subsequent to a temporary network interruption at a sync client, a sync proxy, and/or a sync controller. During the interruption, the sync client, the sync proxy, and/or the sync controller may miss updates (e.g. notifications messages) from a corresponding connected component. After recovery, the sync client, the sync proxy, and/or the sync controller may detect missed updates when receiving notification messages received from a corresponding connected component. For example, a sync controller may detect missed notifications from a sync proxy by determining whether the dp_pre in a notification message received from the sync proxy are identical (e.g. no gap) to the local state logged in a last entry associated with the service proxy at the sync controller. A sync proxy may detect missed notifications from a sync controller by determining whether the dc_pre in a notification message received from the sync controller are identical (e.g. no gap) to the last global state logged at the sync proxy. A sync client may detect missed notifications from a sync proxy by determining whether the dr_pre in a notification message received from the sync proxy are identical (e.g. no gap) to the last root state logged at the sync client. For example, an interest packet for a recovery message may comprise a name field 1510 as shown below:

<Routing-Prefix>:<ServiceID>:<Msg-Type>: <digest_last>:<digest_new> where Routing-Prefix may vary depending the intended recipient as shown in Table 1 herein above. The ServiceID, Msg-Type, digest_last, and digest_new may indicate information as shown below:

TABLE 8

Descriptions of name identifiers for recovery messages

| Names | Descriptions |
|---|---|
| ServiceID | Service name (e.g. chatroom-name) |
| Msg-Type | Recovery |
| digest_last | Last logged root state dr, last global state dc, or last local state dp. |
| digest_new | Most recent received root state dr, global state dc, or local state dp. |

It should be noted that the digest_last and digest_new may vary depending on the sender and/or the recipient. For example, when a sync client request digest log history from a sync proxy, the digest_last and digest_new may refer to the rood state dr. When a sync proxy request digest log history from a sync controller, the digest_last and digest_new may refer to the global state dc. When a sync controller request digest log history from a sync proxy, the digest_last and digest_new may refer to the local state state dp associated with the sync proxy. The digest_last and digest_new may indicate the missing digest log history.

Figure 16:
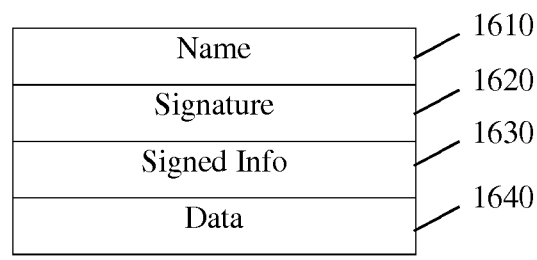
FIG. 16 is a schematic diagram of an embodiment of an ICN protocol data packet.

FIG. 16 is a schematic diagram of an embodiment of an ICN protocol data packet 1600. The packet 1600 may comprise a name field 1610, a signature field 1620, a signed information field 1630, and a data field 1640. The name field 1610 may be substantially similar to name field 1510. The signature field 1620 may indicate a signature (e.g. in FP) of a conference participant (e.g. at a UE 130). The signed information field 1630 may indicate credential information (e.g. in FP) of a conference participant.

In an embodiment, conference service control messages, such as session setup and/or close response messages and/or recovery data messages, may be sent as ICN protocol data packets 1600. In a session setup and/or close process, a sync proxy may respond to a sync client by sending a session setup response and/or a session close response. For example, a data packet for a session setup and/or close response message may comprise a name field 1610 substantially similar to the name field in a session setup and/or close interest described herein above. The data field 1640 in a data packet for the session setup and/or close response may include a root state (e.g. dr) at the sync proxy and/or an acknowledgement to the requested session setup and/or close.

In a recovery process, a sync proxy, and/or a sync controller may respond to a connected component's recovery request message by sending a digest log history. The depth (e.g. number of log entries) of the digest log may be determined by the digest_last and digest_new indicated in a recovery interest packet as described herein above and/or the depth in the cache as maintained by a responding component. For example, a data packet for a recovery response message may comprise a name field 1610 substantially similar to the name field in a recovery interest described herein above. The data field 1640 in a data packet for the recovery response may include history of FPs that are updated between the digest_last and digest_new indicated in the name field 1610.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A multi-tier conference service controller comprising:
   a network interface connecting the conference service controller to a plurality of conference service proxies and further connecting the conference service controller to a plurality of conference service clients via the conference service proxies to form a multi-tier conference service network;
   a memory configured to store a conference digest log, the conference digest log comprising a plurality of conference events performed by the conference service clients, each of the conference events comprising a fingerprint (FP) update, the conference digest log comprising a plurality of entries associated with previous FP updates for the conference events performed by the conference service clients; and
   a processor coupled to the network interface and the memory, wherein the processor is configured to:
      receive, via the network interface, a first message from a first conference service proxy, the first message comprising a first FP update associated with a recent conference event performed by a first conference service client associated with the first conference service proxy, the first FP update comprising a type of the recent conference event, a signature profile of a conference participant associated with the first conference service client, and a non-location based address of a data object associated with the recent conference event and being related to content that is accessed during the recent conference event;
      update the conference digest log according to the first FP update;
      push, via the network interface, a second message to a second conference service proxy, the second message comprising a current entry for the first conference service proxy in the conference digest log, a last entry for the first conference service proxy obtained from the entries associated with the previous FP updates, and the first FP update of the first message;
      perform a third update to the conference digest log by removing the first conference service client from the conference digest log; and
      push, via the network interface, a third message indicating the removal of the first conference service client to the second conference service proxy.

2. The multi-tier conference service controller of claim 1, wherein the first message further comprises a last local state of the first conference service proxy and a current local state of the first conference service proxy, and wherein to update the conference digest log, the processor is further configured to:
   generate an entry associated with the first conference service proxy in the conference digest log;
   record the current local state as a local state in the current entry; and
   record the first FP update of the first message in the current entry.

3. The multi-tier conference service controller of claim 2, wherein the processor is further configured to:
   determine that the conference service controller has missed one or more updates from the first conference service proxy when the last local state of the first message is different from a current local state recorded in the last entry in the conference digest log associated with the first conference service proxy;
   transmit, via the network interface, a recovery request message to the first conference service proxy to request the missed updates; and
   receive, via the network interface, a recovery data message comprising at least one of the missed updates from the first conference service proxy.

4. The multi-tier conference service controller of claim 1, wherein the processor is further configured to generate the current entry in the conference digest log in association with the first conference service proxy and to compute a global state for the current entry by incrementing a global state in the last entry of the conference digest log, and wherein the second message further comprises the global state in the last entry and the global state in the current entry.

5. The multi-tier conference service controller of claim 1, wherein the processor is further configured to:
   receive, via the network interface, a recovery request message from the first conference service proxy, wherein the recovery request message comprises a request for the conference digest log between a first global state and a second global state;
   extract a portion of the conference digest log according to the first global state and the second global state; and
   transmit, via the network interface, a recovery data message comprising the extracted portion of the conference digest log to the first conference service proxy.

6. The multi-tier conference service controller of claim 1, wherein the conference digest log comprises a record of the conference service proxies and the conference service clients, an association between each conference service client and each conference service proxy, and the conference event of the conference service clients at specified times.

7. The multi-tier conference service controller of claim 1, wherein the type of recent conference event of the first FP update of the first message indicates a conference join request, a conference leave, a conference re-join request, or combinations thereof.

8. The multi-tier conference service controller of claim 1, wherein the conference service controller is an Information Centric Networking (ICN)-enabled service controller for the conference, wherein the first message and the second message are ICN-protocol interest packets, and wherein the first message and the second message each comprises a routable name-based identifier.

9. A method for synchronizing service controls for a conference at a conference service controller in a multi-tier Information Centric Networking (ICN) network, the method comprising:
receiving a first message from a first conference service proxy, the first conference service proxy being associated with a plurality of conference service clients, the first message comprising a first fingerprint (FP) update including information related to a conference event, the first FP update comprising a conference event type, a signature profile of a conference participant associated with a first conference service client, and an ICN non-location based address of a data object associated with the conference event and being related to content that is accessed during the conference event, the first message further comprising a last local state of the first conference service proxy and a current local state of the first conference service proxy;
performing a first update to a conference digest log according to the first FP update, the conference digest log comprising, a plurality of conference events performed by the conference service clients, and the conference digest log comprising a plurality of entries associated with previous FP updates for conference events performed by the conference service clients;
pushing a second message to a second conference service proxy, wherein the second message comprises a current entry for the first conference service proxy in the conference digest log, a last entry first conference service proxy obtained from the entries associated with the previous FP updates, and the first FP update;
determining that the conference service controller has missed one or more updates from the first conference service proxy when the last local state of the first message is different from a current local state associated with the first conference service proxy;
transmitting a recovery request message to the first conference service proxy to request the missed updates; and
receiving a recovery data message comprising at least one of the missed updates from the first conference service proxy.

10. The method of claim 9, wherein the first message further comprises a last local state of the first conference service proxy and a current local state of the first conference service proxy, wherein performing the first EP update comprises:
generating an entry associated with the first conference service proxy in the conference digest log;
recording the current local state as a local state in the current entry; and
recording the first FP update in the current entry.

11. The method of claim 9, further comprising:
receiving a third message from a second conference service proxy, wherein the third message comprises a second FP update associated with the second conference service proxy;
performing a second update to the conference digest log according to the third message; and
pushing a fourth message to the first conference service client, wherein the fourth message comprises the second FP update.

12. The method of claim 9, further comprising generating a current global state of the conference service controller and a last global state of the conference service controller based on the current entry and the last entry.

13. The method of claim 9, further comprising generating the current entry in the conference digest log in association with the first conference service proxy to compute a global state for the current entry by incrementing a global state in the last entry of the conference digest log, wherein the second message further comprises the global state in the current entry in the conference digest log, and the global state in the last entry in the conference digest log profile.

14. The method of claim 9, further comprising:
receiving a recovery request message from the first conference service proxy, wherein the recovery request message comprises a request for the conference digest log between a first global state in the conference digest log and a second global state in the conference digest log;
in response to receiving the recovery request message, extracting a portion of the conference digest log according to the first global state and the second global state; and
transmitting a recovery data message comprising the extracted portion of the conference digest log.

15. The method of claim 9, wherein the conference digest log further comprises a plurality of conference events performed by a second plurality of conference service clients associated with a second conference service proxy.

16. The method of claim 9 further comprising:
performing a third update to the conference digest log by removing the first conference service client from the conference digest log; and
pushing a third message indicating the removal of the first conference service client to the second conference service proxy.

17. A computer program product for use by a conference service controller in a multi-tier conference in an Information Centric Networking (ICN) network, wherein the computer program product comprises computer executable instruction stored on non-transitory computer readable medium such that when executed by a processor cause a first conference service client to:
store a conference digest log, the conference digest log comprising a plurality of conference events performed by a plurality of conference service clients, and each of the conference events comprising a first fingerprint (FP) update, and the conference digest log comprising a plurality of entries associated with previous FP updates for the conference events performed by the conference service clients;
receive a first control message from a first conference service proxy, the first control message comprising a first fingerprint (FP) update associated with a recent conference event performed by a first conference service client associated with the first conference service proxy, the first FP update comprising a type of the recent conference event, a signature profile of the conference participant associated with the conference service client associated with the first conference service proxy, and a non-location based address of a data object associated with the recent conference event and being related to content that is accessed during the recent conference event;

update the conference digest log according to the first message;

send a second control message to a second conference service proxy, the second control message comprising a current entry for the first conference service proxy in the conference digest log, a last entry for the first conference service proxy obtained from the entries associated with the previous FP updates;

receive a recovery request message from the first conference service proxy, wherein the recovery request message comprises a request for the conference digest log between a first global state in the conference digest log and a second global state in the conference digest log;

in response to receiving the recovery request message, extract a portion of the conference digest log according to the first global state and the second global state; and transmit a recovery data message comprising the extracted portion of the conference digest log.

18. The computer program product of claim 17, wherein the first control message further comprises a last local state of the first conference service proxy and a current local state of the first conference service proxy, wherein the instructions further cause the processor to:

determine that the conference service controller has missed one or more updates when a last local state of the first control message is different from a current local state associated with the first conference service proxy;

transmit a recovery request message to the first conference service proxy to request the missed updates; and receive a recover data message comprising at least one of the missed updates from the first conference service proxy.

19. The computer program product of claim 18, wherein the second conference service client is associated with a second conference service proxy that is not the first conference service proxy.

* * * * *